(12) United States Patent
Kesavan et al.

(10) Patent No.: US 9,529,551 B2
(45) Date of Patent: *Dec. 27, 2016

(54) SYSTEMS AND METHODS FOR INSTANTANEOUS CLONING

(71) Applicant: NetApp, Inc., Sunnyvale, CA (US)

(72) Inventors: Ram Kesavan, Los Altos, CA (US);
Sriram Venketaraman, Bangalore (IN); Mohit Gupta, San Jose, CA (US); Subramaniam Periyagaram, Campbell, CA (US)

(73) Assignee: NETAPP, INC., Sunnyvale, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/334,349

(22) Filed: Jul. 17, 2014

(65) Prior Publication Data

US 2014/0331011 A1 Nov. 6, 2014

Related U.S. Application Data

(63) Continuation of application No. 13/781,462, filed on Feb. 28, 2013, now Pat. No. 8,812,450, which is a
(Continued)

(51) Int. Cl.
*G06F 3/06* (2006.01)
*G06F 17/30* (2006.01)

(52) U.S. Cl.
CPC .............. *G06F 3/065* (2013.01); *G06F 3/067* (2013.01); *G06F 3/0617* (2013.01);
(Continued)

(58) Field of Classification Search
CPC ............... G06F 17/30091; G06F 17/30115; G06F 17/30129; G06F 17/30203; G06F 3/0617; G06F 3/0619; G06F 3/0641; G06F 3/065; G06F 3/067; G06F 3/0689

See application file for complete search history.

(56) References Cited

U.S. PATENT DOCUMENTS

| 7,321,962 B1 | 1/2008 | Fair et al. |
| 7,562,203 B2 | 7/2009 | Scott et al. |

(Continued)

FOREIGN PATENT DOCUMENTS

| WO | 2010040078 A2 | 4/2010 |
| WO | WO-2010/040078 A2 | 4/2010 |

OTHER PUBLICATIONS

International Preliminary Report on Patentability for International Patent Application No. PCT/US2012/033942, mailed Oct. 29, 2013, 4 pages.
(Continued)

*Primary Examiner* — Jorge A Casanova
(74) *Attorney, Agent, or Firm* — Nixon Peabody LLP; Khaled Shami

(57) ABSTRACT

Techniques to clone a writeable data object in non-persistent memory are disclosed. The writeable data object is stored in a storage structure in non-persistent memory that corresponds to a portion of a persistent storage. The techniques enable cloning of the writeable data object without having to wait until the writeable data object is saved to the persistent storage and without needing to quiesce incoming operations (e.g., reads and writes) to the writeable data object.

20 Claims, 22 Drawing Sheets

Related U.S. Application Data continuation-in-part of application No. 13/098,310, filed on Apr. 29, 2011, now Pat. No. 8,539,008.

(52) U.S. Cl.
CPC .......... *G06F 3/0619* (2013.01); *G06F 3/0641* (2013.01); *G06F 3/0689* (2013.01); *G06F 17/30091* (2013.01); *G06F 17/30115* (2013.01); *G06F 17/30129* (2013.01); *G06F 17/30203* (2013.01)

(56) References Cited

U.S. PATENT DOCUMENTS

| | | | |
|---|---|---|---|
| 7,664,791 | B1 | 2/2010 | Hamilton |
| 7,702,870 | B2 | 4/2010 | English et al. |
| 7,730,277 | B1 | 6/2010 | Prakash et al. |
| 7,870,172 | B1 | 1/2011 | Sarma |
| 7,979,402 | B1 | 7/2011 | Hamilton et al. |
| 8,015,375 | B1 | 9/2011 | Gulve et al. |
| 8,037,349 | B2 | 10/2011 | Mandagere et al. |
| 8,539,008 | B2 | 9/2013 | Faith et al. |
| 8,812,450 | B1 | 8/2014 | Kesavan et al. |
| 2004/0221125 | A1* | 11/2004 | Ananthanarayanan  G06F 3/0613 711/203 |
| 2005/0108296 | A1 | 5/2005 | Nakamura et al. |
| 2005/0246503 | A1 | 11/2005 | Fair et al. |
| 2007/0130431 | A1 | 6/2007 | Sano |
| 2009/0265399 | A1 | 10/2009 | Cannon et al. |
| 2010/0094817 | A1 | 4/2010 | Ben-Shaul et al. |
| 2010/0131480 | A1 | 5/2010 | Schneider |
| 2010/0274772 | A1 | 10/2010 | Samuels |
| 2011/0016095 | A1 | 1/2011 | Anglin et al. |
| 2011/0055621 | A1 | 3/2011 | Mandagere et al. |
| 2012/0278382 | A1 | 11/2012 | Faith et al. |
| 2012/0330903 | A1 | 12/2012 | Periyagaram et al. |

OTHER PUBLICATIONS

International Search Report and Written Opinion for International Patent Application No. PCT/US2012/033942, mailed Oct. 5, 2012, 6 pages.
Co-Pending U.S. Appl. No. 13/781,462 of Kesavan, R., et al., filed Feb. 28, 2013.
Co-Pending U.S. Appl. No. 13/098,310 of Faith, R.E., et al., filed Apr. 29, 2011.
Notice of Allowance Mailed Apr. 23, 2014 in Co-Pending U.S. Appl. No. 13/781,462, filed Feb. 28, 2013.
Notice of Allowance Mailed Jun. 11, 2014 in Co-Pending U.S. Appl. No. 13/781,462, filed Feb. 28, 2013.
Notice of Allowance Mailed May 16, 2013 in Co-Pending U.S. Appl. No. 13/098,310, filed Apr. 29, 2011.
Notice of Allowance Mailed May 16, 2013 in Co-Pending U.S. Appl. No. 13/098,310 of Faith, R.E., filed Apr. 29, 2011.
Notice of Allowance Mailed Apr. 23, 2014 in Co-Pending U.S. Appl. No. 13/781,462 of Kesavan, R., et al., filed Feb. 28, 2013.

\* cited by examiner

| FBN 705 | Extent ID 710 | Length 715 |

Volume layer indirect entry 700

Fig. 7

| Extent ID 805 | Pointer 810 | Offset 815 | Length 820 |

Extent map entry 800

Fig. 8

SYSTEMS AND METHODS FOR INSTANTANEOUS CLONING

CROSS REFERENCE TO RELATED APPLICATION

This application is a continuation of U.S. patent application Ser. No. 13/781,462, filed on Feb. 28, 2013, which is a continuation-in-part of U.S. patent application Ser. No. 13/098,310, filed on Apr. 29, 2011, both of which are incorporated herein by reference in their entirety.

RELATED FIELD

At least one embodiment of the technique introduced here pertains to data storage systems, and more particularly, to cloning a writeable data object in memory.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2011, NetApp, Inc., All Rights Reserved.

BACKGROUND

Typically, cloning technology for storage systems works by building a copy of an object that is stored on a persistent storage medium such as a hard disk. The object on-disk could be a file, a volume, or a data object (i.e., a logical data container). If the source object for cloning already resides on persistent storage such as a hard disk and is not undergoing any changes, the cloning can be done by making an image of the object on-disk to another disk or another location on the same disk. One example of this is cloning of a read-only file on-disk. Cloning a data object in memory can also be done in a simpler fashion if the data object is read-only.

Cloning a data object that is actively being modified, however, typically requires the cloning operation to finish before applying any subsequent incoming operation commands to modify the data object. This creates a delay that slows down the storage system. No specific solutions have been found that resolve this problem adequately.

SUMMARY

The techniques introduced here enable instantaneous cloning of a writeable data object in memory. The writeable data object is stored in a storage structure in memory that corresponds to a portion of a persistent storage. "Instantaneous" cloning means the ability to clone the writeable data object without having to wait until the writeable data object is saved to the persistent storage and without needing to quiesce incoming operations (e.g., reads and writes) to the writeable data object.

Conventional cloning is done by building a copy of an object in persistent storage. This creates a delay and makes it difficult to clone a writeable data object that can be actively modified at any time.

To allow for instantaneous cloning of the writeable data object in memory, the technique introduced here includes a mechanism to manage a write operation to the storage structure in memory. This mechanism enables allocation of a data pointer to the writeable data object to be done without waiting until the writeable data object is saved to the persistent storage. This mechanism also enables freeing of an assigned data pointer to the writeable data object prior to the write operation to execute without waiting until the writeable data object is saved to the persistent storage.

Some embodiments have other aspects, elements, features, and steps in addition to or in place of what is described above. These potential additions and replacements are described throughout the rest of the specification

BRIEF DESCRIPTION OF THE DRAWINGS

One or more embodiments are illustrated by way of example and not limitation in the figures of the accompanying drawings, in which like references indicate similar elements and in which:

FIG. 7 illustrates an exemplary volume layer indirect entry for a leaf node of the extent-based data structure of FIG. 6 when used to implement an indirect volume;

FIG. 8 illustrates an exemplary extent map entry for a leaf node of the extent-based data structure of FIG. 6 when used to implement an extent-to-physical block map;

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

Figure 1:
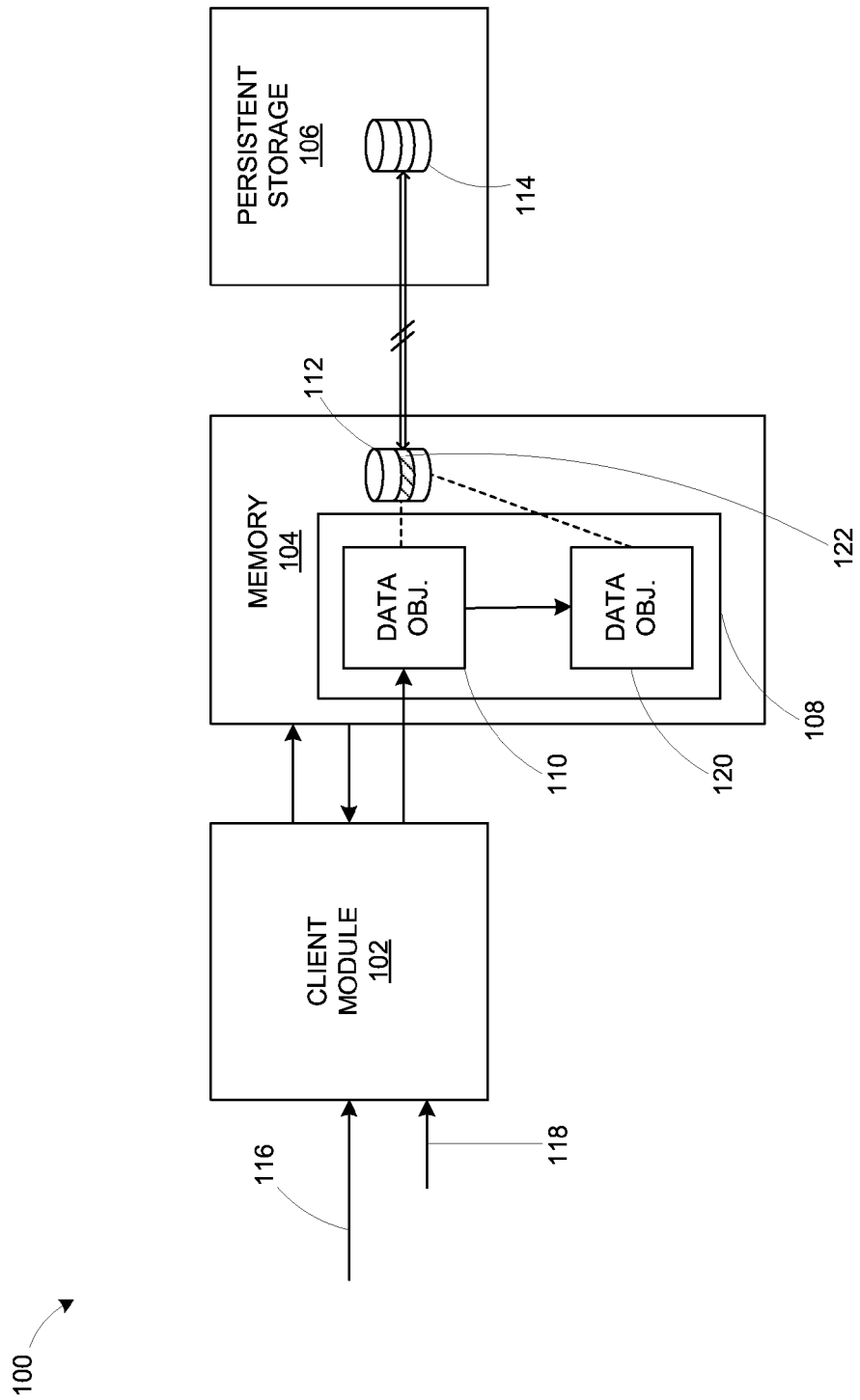
FIG. 1 is an illustration of a storage system for implementing an instantaneous cloning mechanism.

Referring now to FIG. 1, therein is shown an illustration of a storage system 100 for implementing an instantaneous cloning mechanism. The storage system 100 can be, for example, a storage server or a group (e.g., cluster) of storage servers. The storage system 100 communicates with client devices to provide storage services to the client devices. The storage system 100 includes a client module 102, a memory 104, and a persistent storage 106. The client module 102 is configured to manage communication to and from a client device including routing a client I/O request. The client device can be, for example, a computer connected to the storage system 100. The client device can also be a computer cluster connected to the storage system 100 via a network. For example, the client module 102 can be a N-Module as described below in FIG. 2. The memory 104 is a volatile memory of the storage system 100, such as a random access memory within a storage server. The memory 104 can be a core or main memory of the storage system 100. The memory 104 can also be a cache memory of the storage system 100. For example, the memory 104 can be a random access memory (RAM).

The persistent storage 106 includes one or more non-volatile storage devices. For example, such storage devices can be or include disks, magnetic tape, optical disk, flash memory, or a solid-state drives (SSDs).

The memory 104 can include a volume 108. The volume 108 is a logical data container in the memory 104 that references storage space on persistent storage. Within each of the volume 108, there can be an in-memory data object 110. The in-memory data object 110 is a logical data container of reference pointers to data stored elsewhere. The in-memory data object 110 can be within the volume 108. Alternatively, the in-memory data object 110 can exist within the memory 104 without being inside a volume. Another in-memory data object can also be placed within the in-memory data object 110.

Actual data referenced by the in-memory data object 110 can be stored within the memory 104 and/or on the persistent storage 106. For example, an in-memory image 112 of the in-memory data object 110 can be stored in the memory 104.

A persistent storage image 114 of the in-memory data object 110 can be stored on the persistent storage 106. The in-memory data object 110 can store a logical pointer to portions of the in-memory image 112. The in-memory data object 110 can also store a logical pointer to portions of the persistent storage image 114.

The client module 102 can receive a first client request 116 from the client device, where the first client request 116 is a request for a modify/write operation. For example, the modify/write command can be a request to modify a piece of data represented by the in-memory data object 110. When the storage system 100 executes the first client request 116, the in-memory image 112 of the in-memory data object 110 becomes different from the persistent storage image 114 of the in-memory data object 110. Once modified, the in-memory data object 110 can be referred to as "dirty", i.e., where the in-memory image 112 and the persistent storage image 114 are not consistent. The storage system 100 normally saves the "dirty" version of the in-memory data object 110 represented by the in-memory image 112 to the persistent storage image 114 at a later stage of processing, known as a "consistency point". Consistency points may occur at predetermined time intervals (e.g., every 10 seconds) or in response to a specified condition occurring (e.g., memory 104 being filled to a certain percentage of its capacity).

The client module 102 can receive a second client request 118 from the client device, where the second client request 118 is a request for a clone operation, i.e., a request to make a copy of a data object of the storage system 100, such as the in-memory data object 110. The storage system 100 is capable of executing the second client request 118 without waiting for the in-memory image 112 of the in-memory data object 110 to be saved onto the persistent storage 106 at the later stage of processing, i.e., without waiting for the next consistency point.

For example as illustrated, the storage system 100 can execute the clone command to create a data object clone 120 of the in-memory data object 110. Creation of the data object clone 120 can be done without waiting for the in-memory image 112, as described in detail below. A dirty portion 122 of the in-memory image 112 is the difference between the in-memory image 112 and the persistent storage image 114.

The following description associated with FIGS. 2-14 describes an extent-based architecture which can be used in conjunction with the storage system 100 of FIG. 1 to provide instantaneous cloning.

Figure 2A:
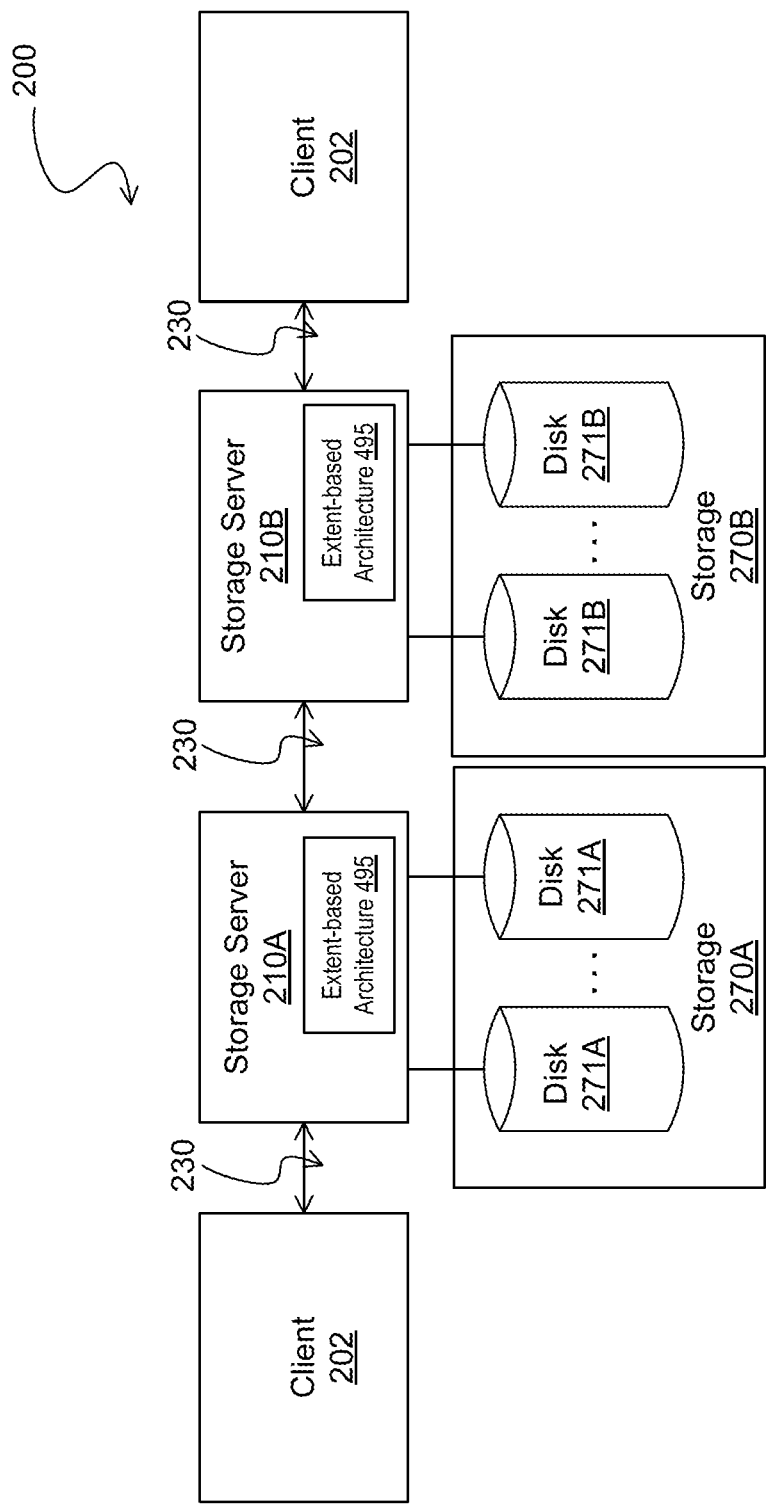
FIG. 2A illustrates a network storage system in which an extent-based storage architecture may be implemented.

FIG. 2A shows a network storage system 200 in which an extent-based storage architecture 495 can be implemented. Storage servers 210 (storage servers 210A, 210B) each manages multiple storage units 270 (storage 270A, 270B) that include mass storage devices. These storage servers 210 provide data storage services to one or more clients 202 through a network 230. Network 230 may be, for example, a local area network (LAN), wide area network (WAN), metropolitan area network (MAN), global area network (GAN) such as the Internet, a Fiber Channel fabric, or any combination of such interconnects. Each of clients 202 may be, for example, a conventional personal computer (PC), server-class computer, workstation, handheld computing or communication device, a virtual machine, or other special or general purpose computer.

Storage of data in storage units 270 is managed by storage servers 210 which receive and respond to various I/O requests from clients 202, directed to data stored in or to be stored in storage units 270. Data is accessed (e.g., in response to the I/O requests) in units of blocks, which in the present embodiment are 4 KB in size, although other block sizes (e.g., 512 bytes, 2 KB, 8 KB, etc.) may also be used. For one embodiment, 4 KB as used herein refers to 4,096 bytes. For an alternate embodiment, 4 KB refers to 4,000 bytes. Storage units 270 constitute mass storage devices which can include, for example, flash memory, magnetic or optical disks, or tape drives, illustrated as disks 271 (271A, 271B). The storage devices 271 can further be organized into arrays (not illustrated) implementing a Redundant Array of Inexpensive Disks/Devices (RAID) scheme, whereby storage servers 210 access storage units 270 using one or more RAID protocols. RAID is a data storage scheme that divides and replicates data among multiple hard disk drives—e.g., in stripes of data. Data striping is a technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the exemplary single file may be stored across the two data drives. Although illustrated as separate components, for one embodiment, a storage server 210 and storage unit 270 may be a part of/housed within a single device.

Storage servers 210 can provide file-level service such as used in a network-attached storage (NAS) environment, block-level service such as used in a storage area network (SAN) environment, a service which is capable of providing both file-level and block-level service, or any other service capable of providing other data access services. Although storage servers 210 are each illustrated as single units in FIG. 2A, a storage server can, in other embodiments, constitute a separate network element or module (an "N-module") and disk element or module (a "D-module"). In one embodiment, the D-module includes storage access components configured to service client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 2B and embodiments of a D-module and an N-module are described further below with respect to FIG. 4.

In yet other embodiments, storage servers 210 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, and etc., provided, for example, on archive, backup, or secondary storage server connected to a primary storage server. A network storage subsystem can also be implemented with a collection of networked resources provided across multiple storage servers and/or storage units.

In the embodiment of FIG. 2A, one of the storage servers (e.g., storage server 210A) functions as a primary provider of data storage services to client 202. Data storage requests from client 202 are serviced using storage device 271A organized as one or more storage objects. A secondary storage server (e.g., storage server 210B) takes a standby role in a mirror relationship with the primary storage server, replicating storage objects from the primary storage server to storage objects organized on storage devices of the secondary storage server (e.g., disks 270B). For example, the storage objects can be replicated from the in-memory image 112 of FIG. 1 to the persistent storage image 114 of FIG. 1. In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e. The secondary storage object) at the secondary storage server.

It will be appreciated that in other embodiments, network storage system 200 may include more than two storage servers. In these cases, protection relationships may be operative between various storage servers in system 200 such that one or more primary storage objects from storage server 210A may be replicated to a storage server other than storage server 210B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
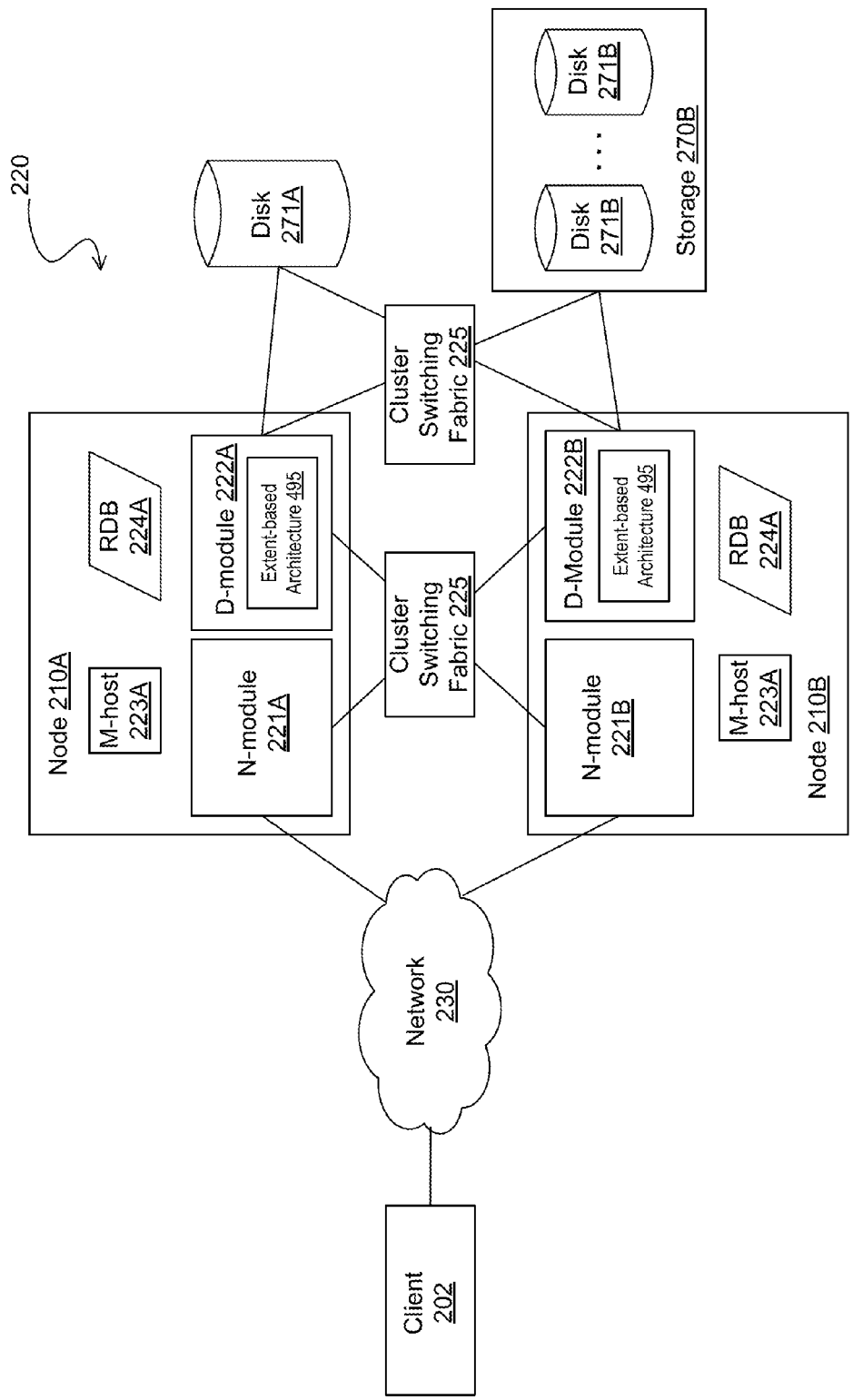
FIG. 2B illustrates a distributed or clustered architecture for a network storage system in which an extent-based storage architecture may be implemented in an alternative embodiment.

FIG. 2B illustrates a block diagram of a distributed or clustered network storage system 220 which may implement instantaneous cloning in one embodiment. System 220 may include storage servers implemented as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one embodiment, each module includes a processor and memory for carrying out respective module operations. For example, N-module 221 may include functionality that enables node 210 to connect to client 202 via network 230 and may include protocol components such as a media access layer, Internet Protocol (IP) layer, Transport Control Protocol (TCP) layer, User Datagram Protocol (UDP) layer, and other protocols known in the art. N-module 221 can be the client module 102 of FIG. 1.

In contrast, D-module 222 may connect to one or more storage devices 271 via cluster switching fabric 225 and may be operative to service access requests on devices 270. In one embodiment, the D-module 222 implements an extent-based storage architecture 495, as will be described in greater detail below. In one embodiment, the D-module 222 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a RDB 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the M-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N-modules and D-modules constituting a node in the illustrative system, there may be different number of N- and D-modules constituting a node in accordance with various embodiments of instantaneous cloning. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Figure 3:
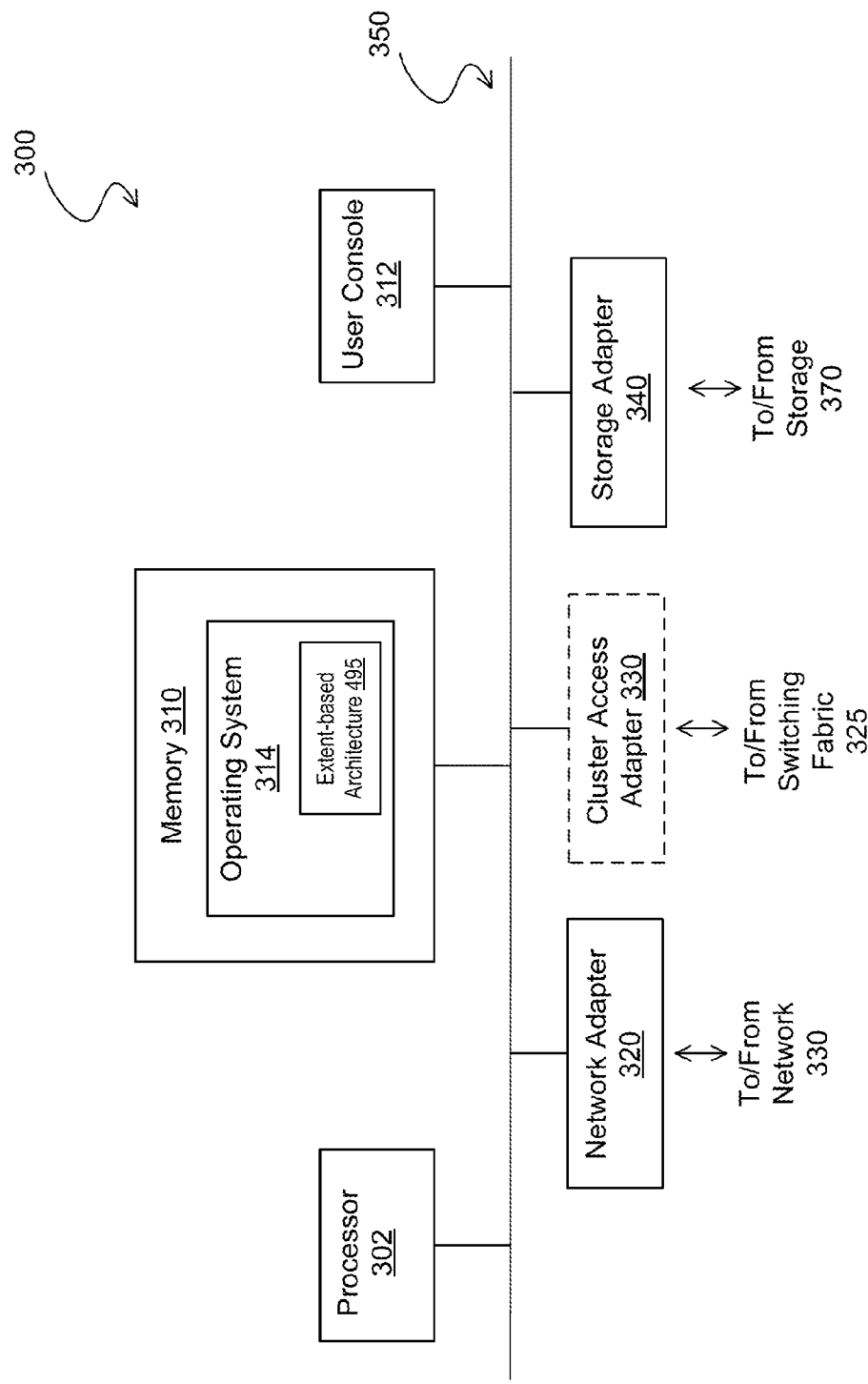
FIG. 3 is a block diagram of an illustrative embodiment of the hardware architecture of a storage server in which an extent-based storage architecture may be implemented.

FIG. 3 is a block diagram of an embodiment of a storage server 300, such as storage servers 210A and 210B of FIG. 2A, embodied as a general or special purpose computer including a processor 302, a memory 310, a network adapter 320, a user console 312 and a storage adapter 340 interconnected by a system bus 350, such as a convention Peripheral Component Interconnect (PCI) bus. Certain standard and well-known components, which are not germane to the understanding of embodiments, are not shown.

The processor 302 is the central processing unit (CPU) of the storage server 210 and, thus, controls its overall operation. The processor 302 accomplishes this by executing software stored in memory 310. For one embodiment, multiple processors 302 or one or more processors 302 with multiple cores are included in the storage server 210. For one embodiment, individual adapters (e.g., network adapter 320 and storage adapter 340) each include a processor and memory for carrying out respective module operations.

Memory 310 includes storage locations addressable by processor 302, network adapter 320 and storage adapter 340 configured to store processor-executable instructions and data structures associated with implementation of an extent-based storage architecture, such as the extent-based storage architecture 495. Storage operating system 314, portions of which are typically resident in memory 310 and executed by processor 302, functionally organizes the storage server 210 by invoking operations in support of the storage services provided by the storage server 210. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be implemented by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. The network adapter 320 may include protocol components such as a Media Access Control (MAC) layer, Common Internet File System (CIFS), Network File System (NFS), Internet Protocol (IP) layer, Transport Control Protocol (TCP) layer, User Datagram Protocol (UDP) layer, and other protocols known in the art for facilitating such connectivity. Each client may communicate with the storage server over the network by exchanging discrete frames or packets of data according to pre-defined protocols, such as TCP/IP.

Storage adapter 340 includes a plurality of ports having input/output (I/O) interface circuitry to couple the storage devices (e.g., disks) to bus 321 over an I/O interconnect arrangement, such as a conventional high-performance, FC or SAS link topology. Storage adapter 340 typically includes a device controller (not illustrated) comprising a processor and a memory, the device controller configured to control the overall operation of the storage units in accordance with read and write commands received from storage operating system 314. In one embodiment, the storage operating system 314 implements an extent-based storage architecture 495, as will be described in greater detail below. As used herein, data written by a device controller in response to a write command is referred to as "write data," whereas data read by device controller responsive to a read command is referred to as "read data."

User console 312 enables an administrator to interface with the storage server to invoke operations and provide inputs to the storage server using a command line interface (CLI) or a graphical user interface (GUI). In one embodiment, user console 312 is implemented using a monitor and keyboard.

When implemented as a node of a cluster, such as cluster 220 of FIG. 2B, the storage server further includes a cluster access adapter 330 (shown in phantom/broken lines) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 4:
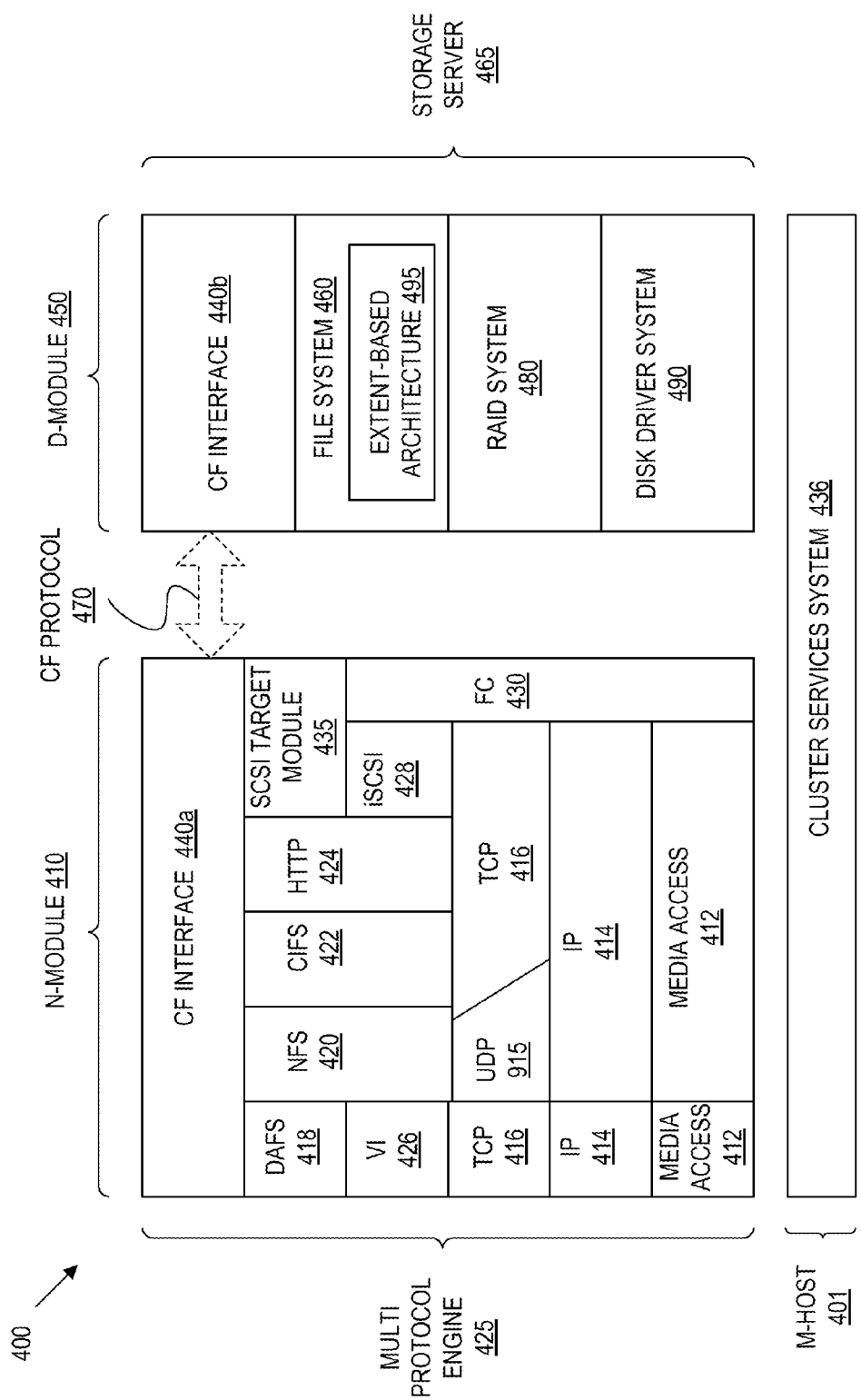
FIG. 4 illustrates an embodiment of the storage operating system of FIG. 3 in which an extent-based storage architecture may be implemented.

FIG. 4 is a block diagram of a storage operating system, such as storage operating system 314 of FIG. 3, that implements an embodiment of an extent-based architecture, such as the extent-based storage architecture 495. The storage operating system comprises a series of software layers executed by a processor, such as processor 302 of FIG. 3, and organized to form an integrated network protocol stack or, more generally, a multi-protocol engine 425 that provides data paths for clients to access information stored on the storage server using block and file access protocols.

Multi-protocol engine 425 includes a media access layer 412 of network drivers (e.g., gigabit Ethernet drivers) that interface with network protocol layers, such as the IP layer 414 and its supporting transport mechanisms, the TCP layer 416 and the User Datagram Protocol (UDP) layer 415. A file system protocol layer provides multi-protocol file access and, to that end, includes support for one or more of the Direct Access File System (DAFS) protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418. An iSCSI driver layer 428 provides block protocol access over the TCP/IP network protocol layers, while a FC driver layer 430 receives and transmits block access requests and responses to and from the storage server. In certain cases, a Fibre Channel over Ethernet (FCoE) layer (not shown) may also be operative in multi-protocol engine 425 to receive and transmit requests and responses to and from the storage server. The FC and iSCSI drivers provide respective FC- and iSCSI-specific access control to the blocks and, thus, manage exports of logical unit numbers (LUNs) to either iSCSI or FCP or, alternatively, to both iSCSI and FCP when accessing data blocks on the storage server.

The storage operating system also includes a series of software layers organized to form a storage server 465 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (VBN) spaces, wherein each volume is associated with a unique VBN.

The file system 460 implements a virtualization system of the storage operating system through the interaction with one or more virtualization modules (illustrated as a SCSI target module 435). The SCSI target module 435 is generally disposed between drivers 428, 430 and the file system 460 to provide a translation layer between the data block (LUN) space and the file system space, where LUNs are represented as data blocks. In one embodiment, the file system 460 implements a Write Anywhere File Layout (WAFL) file system having an on-disk format representation that is block-based using, e.g., 4 KB blocks and using a data structure such as index nodes ("inodes") to identify files and file attributes (such as creation time, access permissions, size and block location). File system 460 uses files to store metadata describing the layout of its file system, including an inode file, which directly or indirectly references (points to) the underlying data blocks of a file.

For one embodiment, the file system 460 includes an extent-based architecture 495 as an extension to WAFL. Operationally, a request from a client is forwarded as a packet over the network and onto the storage server where it is received at a network adapter. A network driver such as layer 412 or layer 430 processes the packet and, if appropriate, passes it on to a network protocol and file access layer for additional processing prior to forwarding to file system 460. There, file system 460 generates operations to load (retrieve) the requested data from the disks if it is not resident "in core", i.e., in memory 310. If the information is not in memory, file system 460, in cooperation with the extent-based architecture 495, accesses an indirect volume to retrieve an extent identifier, accesses an extent-to-physical block map to retrieve a PVBN as described in greater detail with reference to FIGS. 5-14. For one embodiment, the file system 460 passes the PVBN to the RAID system 480. There, the PVBN is mapped to a disk identifier and device block number (disk, DBN) and sent to an appropriate driver of disk driver system 490. The disk driver accesses the DBN from the specified disk and loads the requested data block(s) in memory for processing by the storage server. Upon completion of the request, the node (and operating system 400) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 320, 340 may be configured to offload some or all of the packet processing and storage access operations, respectively, from processor 302, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 450 configured to access data stored on disk. In contrast, multi-protocol engine 425 may be embodied as N-module 410 to perform protocol termination with respect to a client issuing incoming access over the network, as well as to redirect the access requests to any other N-module in the cluster. The N-module 410 can be the client module 102 of FIG. 1. A cluster services system 436 may further implement an M-host (e.g., M-host 401) to provide cluster services for generating information sharing operations to present a distributed file system image for the cluster. For instance, media access layer 412 may send and receive information packets between the various cluster services systems of the nodes to synchronize the replicated databases in each of the nodes.

In addition, a cluster fabric (CF) interface module 440 (CF interface modules 440A, 440B) may facilitate intra-cluster communication between N-module 410 and D-module 450 using a CF protocol 470. For instance, D-module 450 may expose a CF application programming interface (API) to which N-module 410 (or another D-module not shown) issues calls. To that end, CF interface module 440 can be organized as a CF encoder/decoder using local procedure calls (LPCs) and remote procedure calls (RPCs) to communicate a file system command to between D-modules residing on the same node and remote nodes, respectively.

Although embodiments of the present invention are shown herein to implement an extent-based architecture within the illustrated components and layers of a storage server, it will be appreciated that an extent-based architecture may be implemented in other modules or components of the storage server in other embodiments. In addition, an extent-based architecture may be implemented as one or a combination of a software-executing processor, hardware or firmware within the storage server. As such, an extent-based architecture may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write-in-place file systems.

Figure 5:
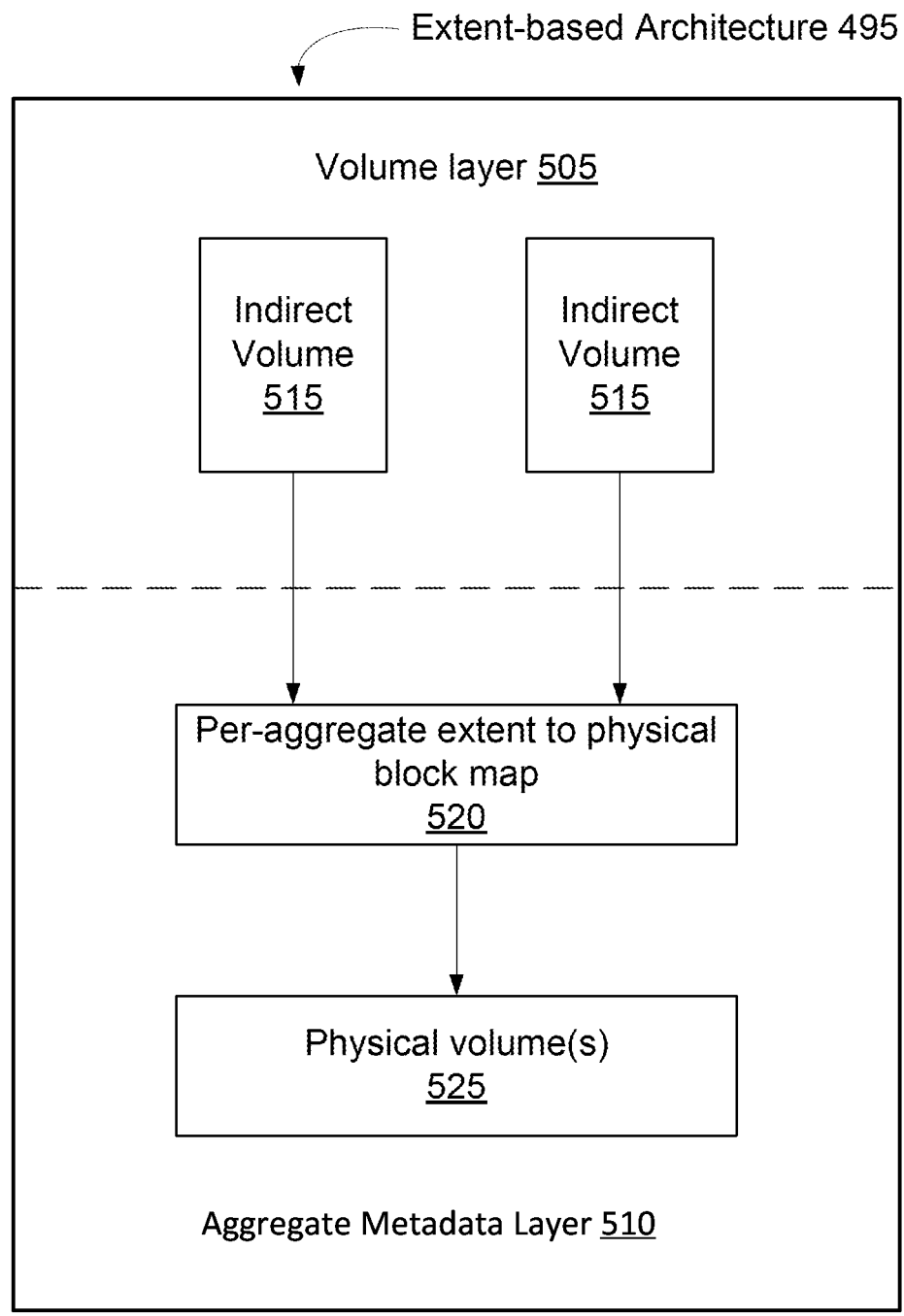
FIG. 5 illustrates an exemplary block diagram of an extent-based storage architecture.

FIG. 5 illustrates an exemplary block diagram of an extent-based storage architecture 495. The extent-based architecture 495 includes a volume layer 505 and an aggregate or region manager layer 510. The volume layer 505 includes one or more indirect volumes 515 to indirectly map an I/O request from a client 202 to one or more physical blocks within the storage devices 271. The contents of the volume layer 505 can reside in volatile memory or be backed up to persistent storage. For one embodiment, the storage server 210 uses one entry in the indirect volumes 515 for each extent, as opposed to prior art block-based implementations that used one indirect volume entry (e.g., in a flexible volume 110) for each data block. For one embodiment, the I/O request references data by way of a file block number (FBN). An FBN refers a data block in a volume 515 as referenced by a client 202. The storage server 210 uses the FBN as a key to access an extent identifier. An extent refers to a contiguous group of one or more data blocks in FBN space. The aggregate metadata layer 510 includes an extent-to-physical block map 520 and one or more physical volumes 525. The extent-to-physical block map 520 maps an extent identifier (e.g., accessed by way of an FBN in the volume layer 505) to a pointer to another extent or to one or more physical volume block numbers (PVBN) in the physical volume 525.

The extent-based entries of the extent-to-physical block map 520 provide per-aggregate indirection. In contrast, virtual volume block numbers (VVBN) of volume containers 120 provide per-volume indirection. A per-aggregate extent-based entry, as used herein, refers to an extent being unique across volume boundaries within an aggregate. A per-volume indirect entry refers to an entry being unique within volume boundaries. For per-aggregate indirection, when the storage server 210 copies, moves, or makes other changes to physical blocks, the changes are reflected within the aggregate metadata layer 510 in the extent-to-physical block map 520.

These changes, however, do not need to be propagated into the volume layer 505 because the extent identifier does not need to change. This enables compression, decompression, sharing, and the termination of sharing of extents to occur without communication with the volume layer 505. Blocks can be easily shared across volume boundaries, enabling cross-volume deduplication. Segment cleaning and related disk gardening techniques can be performed on the extent-to-physical block map 520 in a single pass, all without having to propagate changes up into the volume layer 505.

As set forth in further detail above and below, embodiments of the extent-based architecture include a storage server receiving an I/O request including a file block number (FBN) for an extent. The storage server uses the received FBN as a key to traverse a sorted data structure in the volume layer to an extent identifier. The storage server uses the extent identifier as a key to traverse a second sorted data structure in the aggregate metadata layer to a reference or pointer. The second sorted data structure maps extent identifiers, either directly or indirectly, to Physical Volume Block Numbers (PVBN)'s. For one embodiment, the reference or pointer in the second sorted data structure identifies or refers directly to a PVBN for the extent. Alternatively, the reference or pointer identifies another extent identifier that, in turn, refers directly to a PVBN for the extent. Given that entries in the volume layer are per extent, rather than per data block as in previous implementations of WAFL, the implementation of an extent-based architecture results in a significant decrease in volume layer metadata and, in turn, performance improvements due to the decrease in metadata involved in common operations. By separating the data stored in the volume layer from the data stored in the aggregate metadata layer, the extent-based architecture provides the storage server with the ability to write and rearrange data blocks on disk without changing the corresponding extent identifier(s). This implies that the sorted data structure in the volume layer does not need to be updated for some manipulation of data blocks on disk. Block/extent compression, block/extent decompression, block/extent sharing, disk gardening, etc. can be performed without communicating with the volume layer. Additionally, because the sorted data structure in the volume layer is traversed using an FBN, which is mapped to an extent identifier, the extent-based architecture can avoid the misalignment problem of previous implementations of WAFL when the initial offset of data blocks occurs at a different granularity than the data block size (e.g., a 512 byte offset for 4 KB blocks).

For one embodiment, a PVBN may be referenced directly by only one extent identifier and an extent identifier may not reference a second extent identifier if that second extent identifier references a third extent identifier. This embodiment prevents the level of indirect references in extent map entries from becoming arbitrarily deep and taking an arbitrary amount of time (as measured in terms of disk I/O operations, assuming that each extent entry is likely to be stored within a different disk block and require a separate I/O operation).

For one embodiment, an extent identifier may include multiple references or pointers. Partial ranges of data blocks within an extent can be overwritten, deduplicated, compressed, etc. Additionally, the indirection provided by the extent-based architecture allows partial ranges of data blocks within an extent to be overwritten without first reading the extent. In contrast, an extent overwrite operation in previous implementations of file systems included reading the data blocks of data from a storage device into a buffer, overwriting a portion of the data blocks within the buffer, and writing the updated blocks of data back to the storage device.

For one embodiment, the extent-to-PVBN mapping in the aggregate metadata layer is global across volumes. As used herein, reference to the extent-to-PVBN map global across volumes refers to a storage server 210 being able to share (or end the sharing of) data blocks within extents (e.g., via the extent to physical block map 520) across volume boundaries as defined in the volume layer 515. This is difficult in previous implementations of file systems because file systems typically do not support a layer of indirection that spans a space larger than a single volume.

Figure 6:
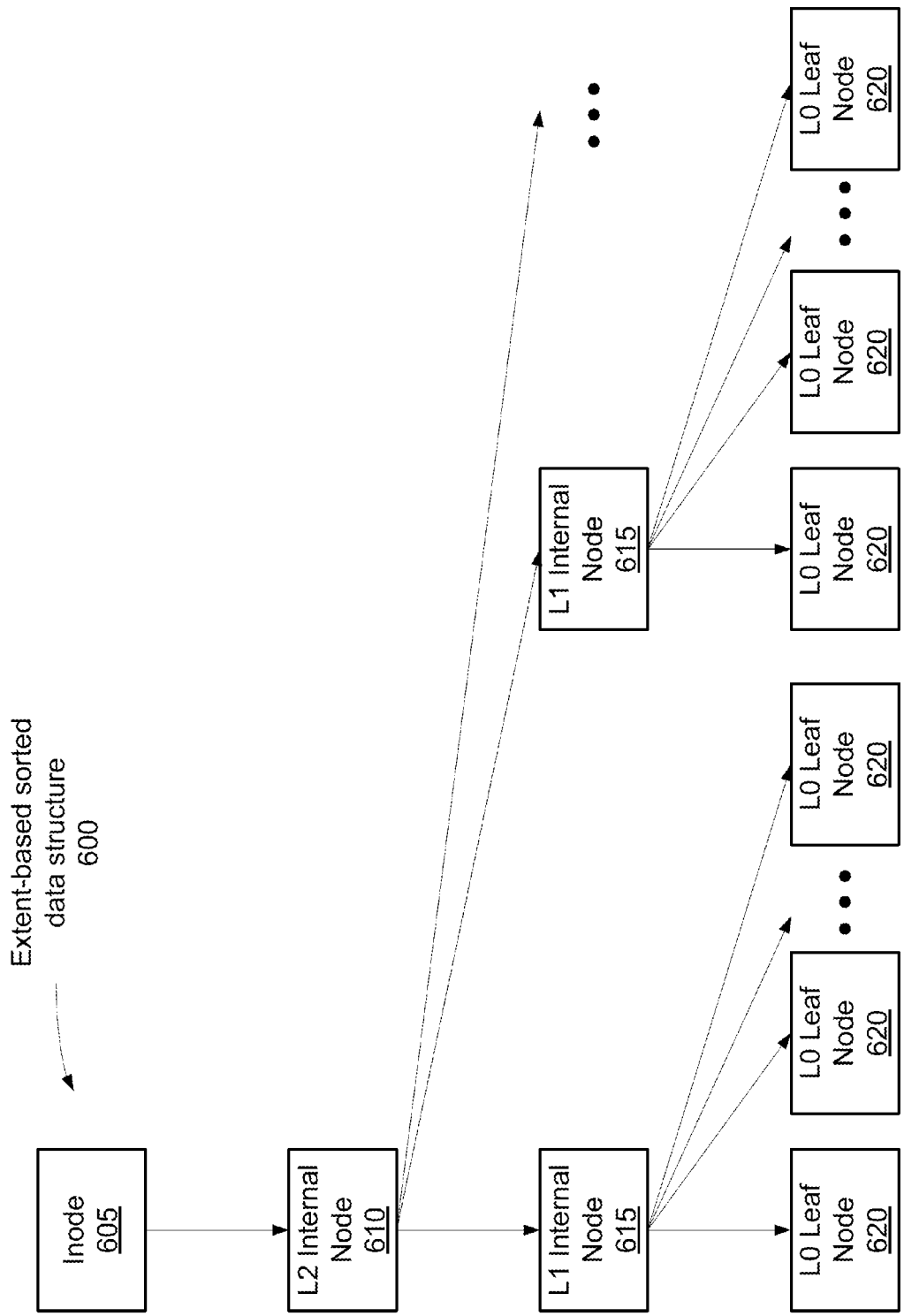
FIG. 6 illustrates an exemplary extent-based sorted data structure within an extent-based storage architecture.

FIG. 6 shows an exemplary extent-based sorted data structure 600 within an extent-based storage architecture. For one embodiment, the extent-based sorted data structure is a B+ tree. Alternatively, the extent-based sorted data structure 600 is another type of tree or sorted data structure that is able to perform lookup and modify operations in, at most, O(log n) time, where n is the number of data blocks in a file. An inode 605 points to the root of the extent-based tree/sorted data structure 600 and contains volume/file metadata and pointers to data blocks 620 or indirect blocks 610/615. For example, in a B+ tree, indirect blocks are referred to as internal nodes 610/615 and data blocks are referred to as leaf nodes 620. For one embodiment, the inode 605 points to one or more branches of internal nodes 610/615. For an alternate embodiment, the inode 605 points directly to the leaf nodes 620. For one embodiment, the internal nodes 610/615 store pointers to other nodes but do not store data, e.g. data such as an FBN, extent identifier, PVBN, etc. The leaf nodes 620, on the other hand, store data, e.g. data such as an FBN, extent identifier, PVBN, etc.

For one embodiment, the lengths of extents vary. For one embodiment the length of an extent is expressed as the number of data blocks of a fixed size within the extent. For example, an extent containing only a single 4 KB block would have a length of 1, an extent containing two 4 KB blocks would have a length of 2, etc. For one embodiment, extents have a maximum length driven by user I/O or write allocation (e.g., extents having a maximum length of 64 blocks). For an alternate embodiment, the length of extents may be consistently defined (e.g., 8 blocks).

For an embodiment utilizing an extent-based tree 600 with variable-length extents, the height of the tree is variable, even between two files of the same size. For one embodiment, the span of an internal node 610/615 is also variable. As used herein, the span of an indirect block refers to the number of blocks to which that indirect block refers. As a comparison, in previous implementations of WAFL the span of an indirect block is fixed: the span of a tradvol indirect block is 1024 blocks, the span of a flexvol indirect block is 510 blocks (e.g., as stored in flexible volume 110), and the span of a 64-bit flexvol indirect block is 255 blocks (e.g., as stored in flexible volume 110).

Additionally, in the previous implementations of WAFL, a contiguous extent containing N blocks would use the same amount of indirect space as N randomly located blocks because each data block of the extent would be represented by a separate indirect entry in the volume layer. An extent-based sorted data structure 600, however, greatly reduces the amount of indirect space used because volume layer entries are per-extent rather than per-block. For example, consider a 64-bit flexvol storing a file containing 532,685,800 bytes of data (approximately 508 MB) as implemented in previous implementations of WAFL. The flexvol includes indirect blocks having 255 entries (a span of 255) and each entry refers to a 4 KB block. The flexvol represents the 508 MB file using two level-2 indirect blocks pointing to 510 level 1 indirect blocks pointing to 130050 4 KB level 0 data blocks. In an extent-based sorted data structure 600, instead of using one entry for each 4 KB block, the storage server 210 uses one entry for each extent. Extents can be longer than a single 4 KB block. For example, an extent is a contiguous group of one or more 4 KB blocks. Using an extent-based sorted data structure 600 with 16 block long extents and 127 entries per block, the storage server 210 represents the 130050 4 KB with only 8129 leaf nodes 620 and 65 internal nodes 610/615, resulting in an 87% savings in indirect block metadata.

For one embodiment, the storage server 210 uses an extent-based sorted data structure 600 to implement an indirect volume 515. For one embodiment, the storage server 210 implements each indirect volume 515 as a B+ tree. FIG. 7 shows an exemplary volume layer indirect entry 700 for a leaf node 620 of an extent-based data structure 600 used to implement an indirect volume 515. The volume layer indirect entry 700 stores an FBN 705, a corresponding extent identifier 710, and a length of the extent 715. The storage server 210 uses the FBN 705 as the primary sorting key to navigate the extent-based sorted data structure 600 and find the extent identifier 710 that corresponds to the FBN 705. For one embodiment, the FBN 705 is 48 bits, the extent identifier 710 is 48 bits, and the length 715 is 8 bits. Alternatively, the storage server 210 uses different sizes for one or more of the FBN 705, extent identifier 710, or length 715. For example, the extent identifier 710 may be 64 bits long in an alternate embodiment to, e.g., provide for 512 byte granularity in the offsets of blocks. For one embodiment, extent lengths 715 vary. For an alternate embodiment, extent lengths 715 are fixed.

For one embodiment, the FBN 705 is 51 bits to provide for 512 byte granularity in the offsets of blocks (where a 48 bit FBN 705 provides for 4 KB byte granularity of FBN offsets). Because the storage server 210 stores indirect blocks using an extent-based sorted data structure 600, FBN's do not need to be aligned based upon block size (e.g., 512 byte offset alignment and 4 KB blocks). The extent-based sorted data structure 600 stores an entry for an entire extent based upon an FBN and length of the extent. The extent-based sorted data structure 600 does not store only the block at that FBN and then require subsequent entries to correspond to each subsequent FBN. For example, given two adjoining extents that are each 16 blocks in length, the two entries in the extent-based sorted data structure 600 for these two extents will have FBN's that are offset by at least 16 blocks. In traversing the extent-based sorted data structure 600, the storage server 210 does not need to assume that each entry is separated by the same offset or that an entry's FBN is offset by a whole number multiple of the block size. Additionally, the savings in indirect metadata resulting from using an extent-based sorted data structure 600 compensates for the use of three additional bits for each FBN 705. Providing the 512 byte offset granularity within the volume layer eliminates the previously described complications resulting from misalignment between blocks in FBN space and blocks in aggregate space. Once an FBN is mapped to an extent identifier 710, the extent identifier can be mapped to an extent (as described below) without concern of misalignment because the aggregate metadata layer maintains a consistent block-sized alignment of offsets within the aggregate.

The storage server 210 allocates extent identifiers 710 during write allocation. For one embodiment, the storage server 210 allocates extent identifiers 710 from a finite pool. Alternatively, extent identifiers 710 are monotonically increasing values that never wrap.

For one embodiment, the length 715 of an extent is used for a consistency check as described with reference to FIG. 8 below.

The per-volume container files 120 of previous implementations of WAFL are not used in an extent-based sorted data structure 600 used to implement an indirect volume 515. Instead of per-volume container files 120, the storage server 210 uses an extent-to-physical block map 520. As described above, the use of the extent-to-physical block map 520 can result in reduced indirect metadata. The indirect volume blocks, however, no longer contain cached pointers to PVBN's. Accesses to an extent involves the storage server 210 looking up an extent identifier 710 in the indirect volume 515 and looking up the PVBN (e.g., by way of a pointer) in the extent-to-physical block map 520. The computational overhead of this additional I/O look-up is offset by some of the features of extent-based architecture 495. For example, I/O accesses are per extent rather than per block and, therefore, multiple blocks are accessed by a single I/O access of each the indirect volume 515 and the extent-to-physical block map 520. Additionally, the extent-based architecture 495 gains advantages in compression, deduplication, segment cleaning, etc., which can be performed with altering the extent identifier 710. Actions such as deduplication can easily span the aggregate rather than just a single volume and many changes to blocks, e.g., resulting from compression and segment cleaning, do not need to be propagated up to the indirect volume 515 (e.g., to correct cached indirect pointers as in previous implementations of WAFL).

For one embodiment, the storage server 210 uses an extent-based sorted data structure 600 to implement an extent-to-physical block map 520. For one embodiment, the storage server 210 implements an extent-to-physical block map 520 as a B+ tree. FIG. 8 shows an exemplary extent map entry 800 for a leaf node 620 of an extent-based sorted data structure 600 used to implement an extent-to-physical block map 520. Leaf nodes 620 of an extent-based sorted data structure 600 used to implement an extent-to-physical block map 520 store extent identifiers 805, references 810 such as a pointers to PVBN's or other extent identifiers, offsets for the extents 815, and lengths for the extents 820. As used herein, an offset for an extent is a distance in blocks from the first block of the contiguous group of blocks that make up an extent. For one embodiment, the extent identifier 805 is 48 bits, the pointer/extent identifier 810 is 48 bits, the offset 815 is 8 bits, and the length 820 is 8 bits. For an alternate embodiment, different numbers of bits are used for each portion of an extent map entry 800.

For one embodiment, each extent map entry 800 includes either a pointer or other reference 810 directly to a PVBN or to another extent identifier 805 that directly references a PVBN. For one embodiment, each PVBN is owned by only one extent and any other extent that references the PVBN does so by way of referencing the owner extent. As a result, the maximum additional look-up for a given extent to get to a PVBN should be no more than one. This maximum prevents the level of indirect references in extent map entries 800 from becoming arbitrarily deep and taking an arbitrary amount of time (as measured in terms of disk I/O operations, assuming that each extent entry is likely to be stored within a different disk block). As a result of extents having a single owner, the storage server 210 can use the owner extent identifier as a tag, unique number, or other context for the purpose of lost write detection.

For an alternate embodiment, all extent identifiers 805 map directly to a PVBN and PVBN's can be owned by more than one extent. For an embodiment including lost write detection, the storage server 210 creates a context, tag, or unique number, e.g., via a separate table, that is separate/different from the extent identifiers 805 due to the possibility of multiple extent identifiers referencing a single PVBN.

For one embodiment, the storage server 210 checks data consistency by comparing the length 715 of an extent as stored in the volume layer 505 with the length 820 of the extent as stored in the aggregate metadata layer 510.

For one embodiment, the storage server 210 utilizes a finite number of extent identifiers. If an extent identifier is a candidate to be reused, e.g., upon a request to delete the extent, the storage server 210 first determines whether or not other extents refer to that extent identifier. If one or more extents reference the candidate extent identifier, the storage server 210 ensures that the one or more extents continue to point to the same data (e.g., by altering one of the extents to directly reference the corresponding PVBN and the other extents to reference that altered extent). For one embodiment, the storage server 210 maintains, e.g., in one or more metafiles, reference counts for references by extents to each extent and by extents to each PVBN. Reference counts enable the storage server 210 to be aware of whether or not other extents would be affected by operations performed on an extent/PVBN (e.g., reallocation, segment cleaning, etc.). The storage server 210 tracks increments and decrements of the reference count in one or more log files. For example, the storage server 210 would increment a reference count when a new extent/PVBN is allocated, when an extent identifier is shared (e.g., via clone creation, snapshot creation, or deduplication), etc. For one embodiment, the storage server 210 accumulates increments and decrements using a log file and makes batch updates to reference count metafiles, e.g., at a consistency point. For one embodiment, the storage server 210 increments a reference count from 0 to 1 for a PVBN directly (bypassing the log file) when allocating a new extent/PVBN and executes all other increments and decrements of the reference counts via the respective reference count log file.

A hierarchical reference counting the volume layer indirect entry 700 can be tracked. Every use of a reference pointer, such as the Extent ID 805 and the extent ID 710, is tracked as a single reference count by a reference count metafile, which is described later in FIG. 14. For example, if three objects reference the same set of data blocks using the extent ID 805, then the reference count for the extent ID 805 is 3. An entire file system tree of objects can be tracked by a hierarchical reference count (h-refcnt) of an extent ID of the root of that tree. In other words, a h-refcnt on a root node of a data object is the same as a reference count increment of each reference pointer pointed to by walking down the tree rooted at the data object.

The data objects in the extent-based data structure 600 are essentially a tree of reference pointers. In a hierarchically reference counted file system based on the extent-based data structure 600, any data object can be instantaneously cloned by creating a new h-refcnt on the root of the tree of reference pointers that represent the data object, such as the extent-based data structure 600. Any data object that has been written out to persistent storage already has a reference pointer assigned to it. Therefore, for example, creating an instantaneous clone of the extent-based data structure 600 is accomplished by taking an extra h-refcnt on the reference pointer of the root node of the extent-based data structure 600. Creating a clone of a data object that has not yet been written to persistent storage is done by allocation a reference pointer on-the-fly.

Figure 9:
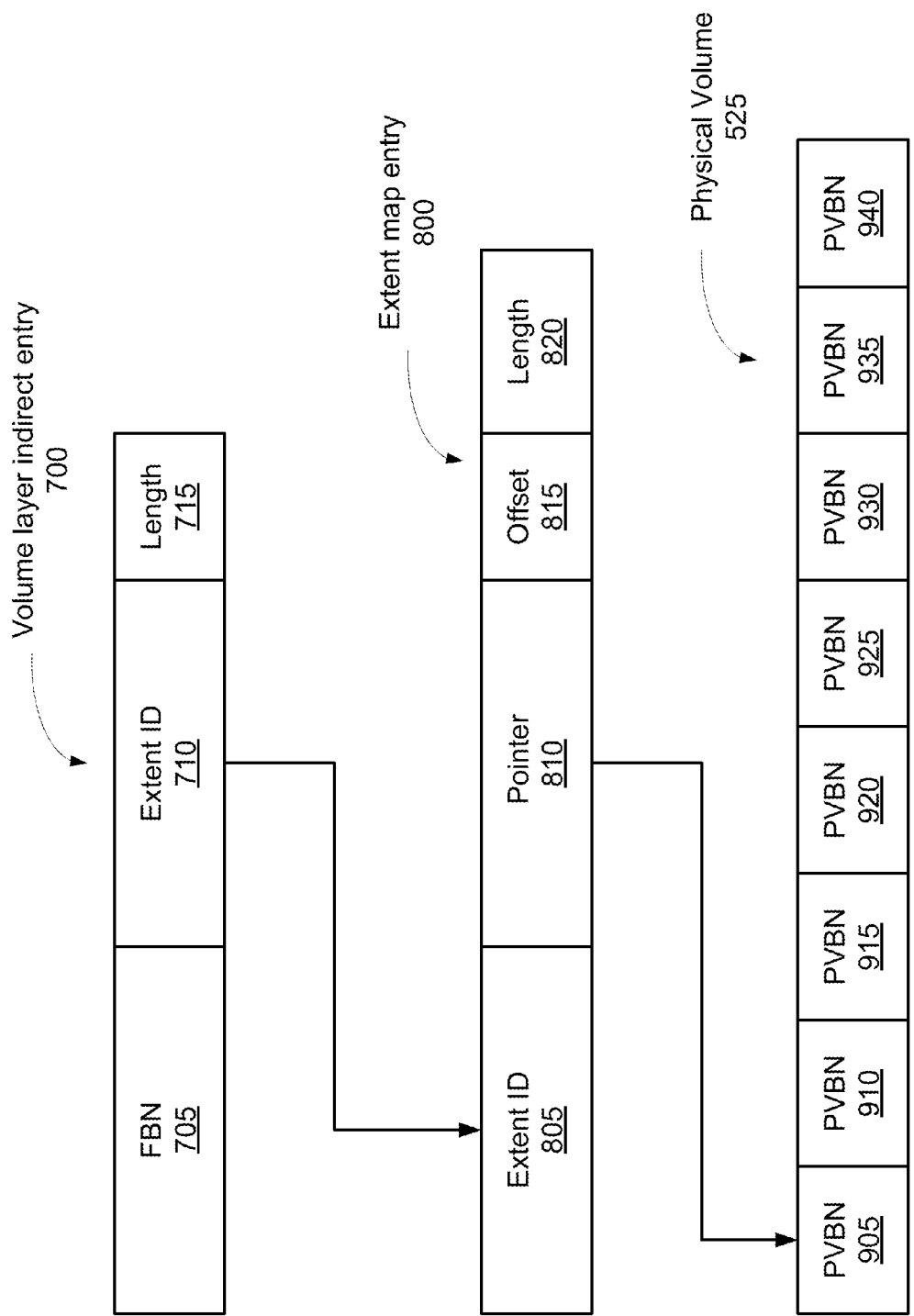
FIG. 9 illustrates an exemplary sequence of look ups in the volume layer and aggregate metadata layer of an extent-based storage architecture to map an FBN to a PVBN.

FIG. 9 shows an exemplary sequence of look ups in the volume layer 505 and aggregate metadata layer 510 to map an FBN to a PVBN in the physical volume 525. For example, when the storage server 210 receives an I/O request including an FBN 705, the storage server 210 uses the FBN as a key in an indirect volume 515 to look up an extent identifier 710 in a volume layer indirect entry 700. The storage server 210 uses the extent identifier 710 as a key to look up an extent map entry 800 in an extent-to-physical block map 520. The storage server 210 uses the pointer 810 to access PVBN 905 in the physical volume 525. In this example, the offset 815 is zero. If the offset was a positive value, the storage server 210 would access one or more blocks subsequent to PVBN 905 (e.g., PVBN 910, PVBN 915, etc.). If the length 820 is greater than 1, the storage server 210 would access PVBN 905 and one or more subsequent blocks (e.g., PVBN 910, PVBN 915, etc.).

Figure 10:
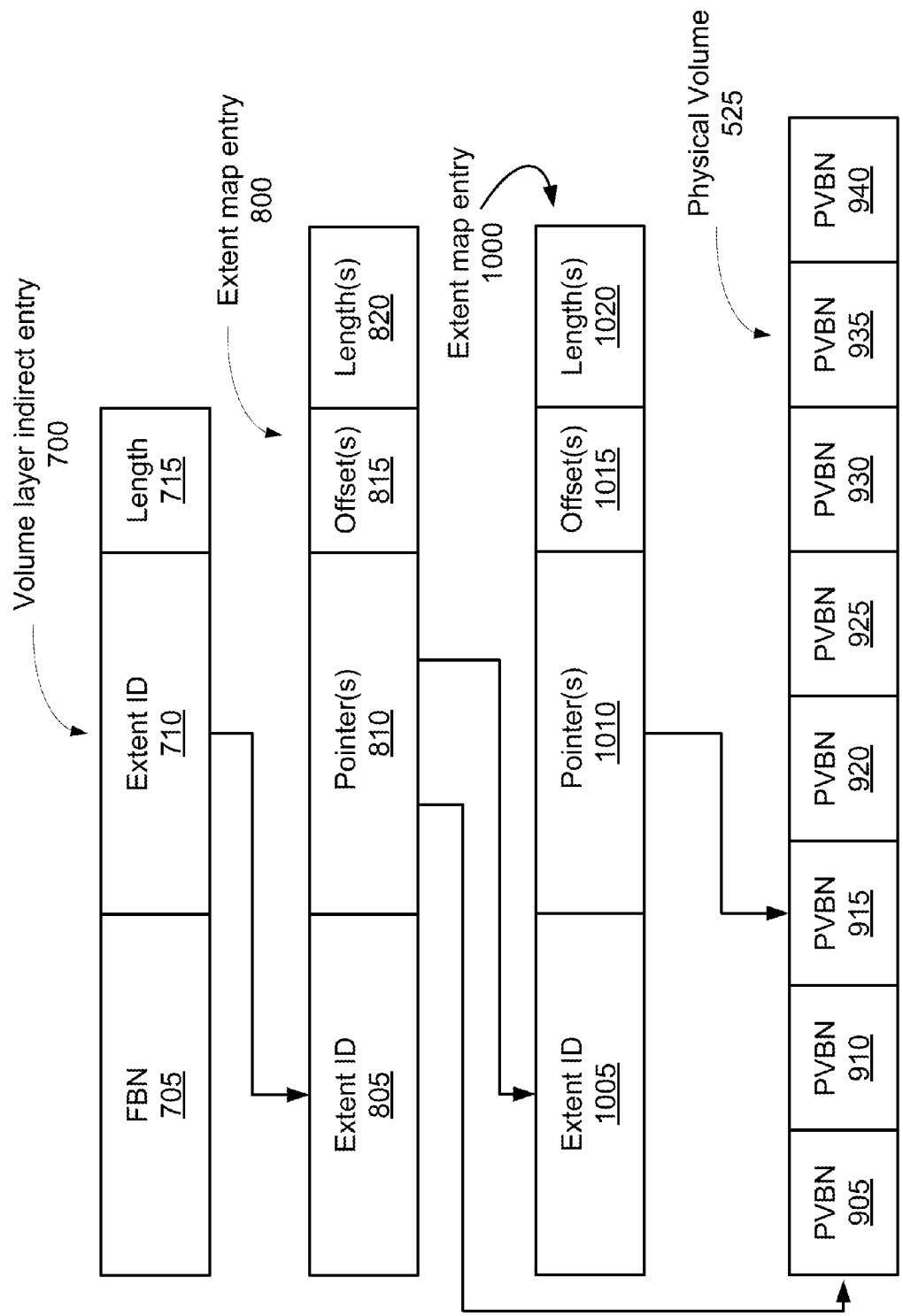
FIG. 10 illustrates another exemplary sequence of look ups in the volume layer and aggregate metadata layer of an extent-based storage architecture to map an FBN to a PVBN.

FIG. 10 shows another exemplary sequence of look ups in the volume layer 505 and aggregate metadata layer 510 to map an FBN to a PVBN in the physical volume 525. Similar to the example described with reference to FIG. 9, the storage server 210 receives an I/O request including an FBN 705 and uses the FBN as a key in an indirect volume 515 to look up an extent identifier 710 in a volume layer indirect entry 700. The storage server 210 uses the extent identifier 710 as a key to look up a first extent map entry 800 in an extent-to-physical block map 520. In this example, the extent identifier 805 is associated with pointer 810 to a PVBN 905 and a pointer or extent identifier 810 to a second extent map entry 1000. For one embodiment, the first extent has multiple extent map entries 800, one for each pointer or reference 810. For example, each entry 800 would include the same extent identifier 805, but different combinations of pointer 810, offset 815, and length 820. For the sake of simplicity, FIG. 10 illustrates a single extent map entry that includes multiple pointers 810, offsets 815, and lengths 820. The storage server 210 uses the pointer 810 to access PVBN 905 in the physical volume 525. The storage server 210 uses the extent identifier 810 to look up the second extent map entry 1000 in the extent-to-physical block map 520. The storage server 210 uses the pointer 1010 to access PVBN 915 in the physical volume 525.

Figure 11:
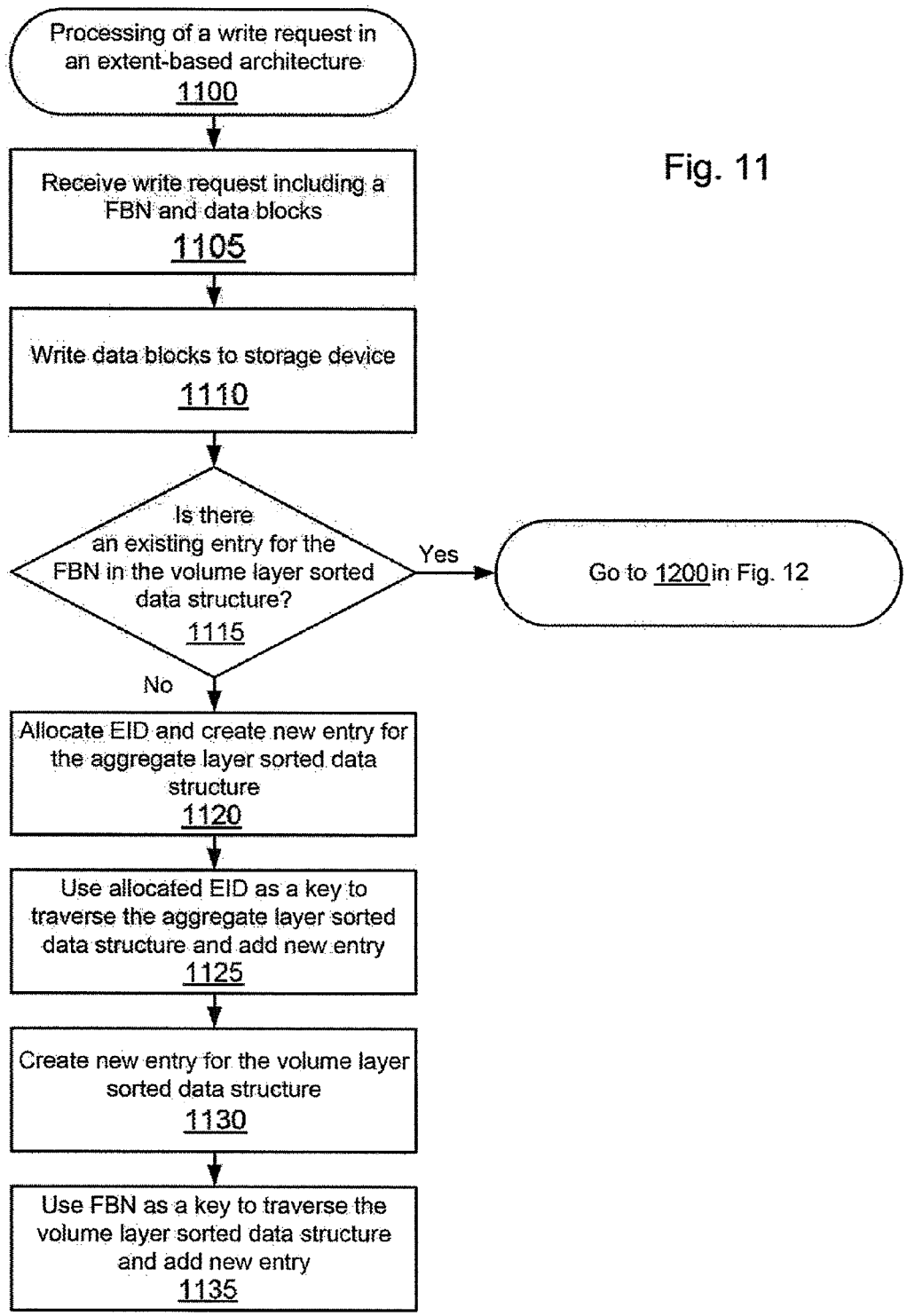
FIG. 11 is an exemplary method of processing a write request in an extent-based architecture.

FIG. 11 is an exemplary method 1100 of processing a write request in an extent-based architecture. At processing block 1105, the storage server 210 receives a write request including an FBN and data blocks to be written from a client 202. For one embodiment, the client 202 provides the data to be written. Alternatively, the client 202 provides a reference to the data to be written. At processing block 1110, the storage server 210 writes the data blocks to a storage device 271. At decision block 1115, the storage server 210 determines if there is an existing entry in the volume layer sorted data structure 600 that includes an FBN 705 that matches or overlaps with the FBN provided with the write request. If there is a matching or overlapping extent, the storage server proceeds to processing the overwrite request 1200 as described in further detail below with reference to FIG. 12. At processing block 1120, if there is not a matching or overlapping extent, the storage server allocates an extent identifier 805 and creates a new entry 800 for the aggregate metadata layer extent-based sorted data structure 600 (e.g., extent-to-physical block map 520) including the extent identifier 805, a reference 810 to the newly stored extent, an offset 815, and the length 820 of the extent. At processing block 1125, the storage server 210 uses the allocated extent identifier 805 as a key to traverse the aggregate metadata layer extent-based sorted data structure 600 and add the newly created entry 800. At processing block 1130, the storage server 210 creates a new entry 700 for the volume layer extent-based sorted data structure 600 (e.g., indirect volume 515) including the FBN 705 provided with the write request by the client 202, the allocated extent identifier 710/805, and the length 715/820 of the extent. At processing block 1135, the storage server 210 uses the FBN 705 to traverse the volume layer extent-based sorted data structure 600 and add the newly created entry 700. For one embodiment, the storage server 210 returns an indication to the client 202 that the write request was successfully processed.

Figure 12:
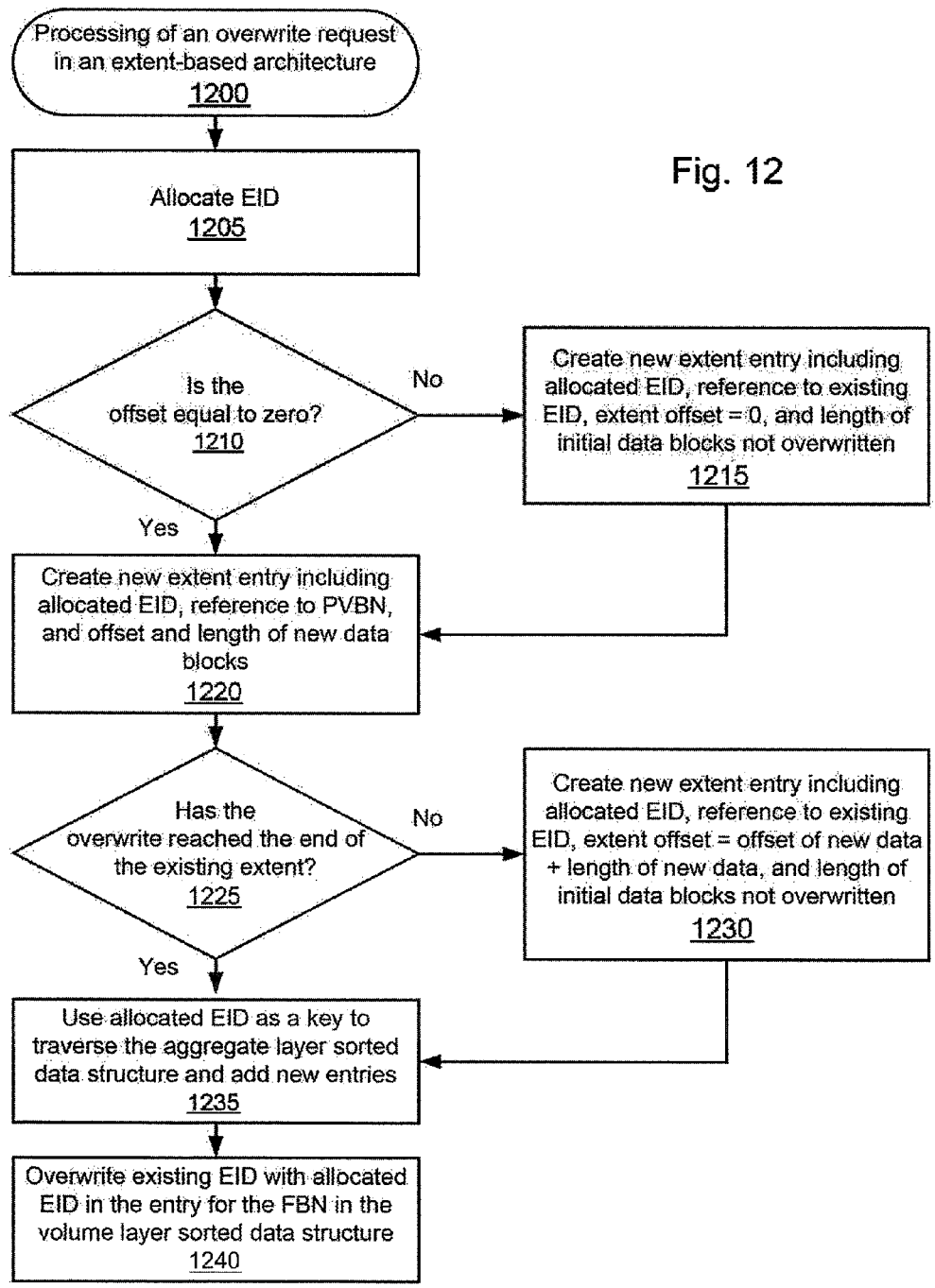
FIG. 12 is an exemplary method of processing an overwrite request in an extent-based architecture.
Figure 13:
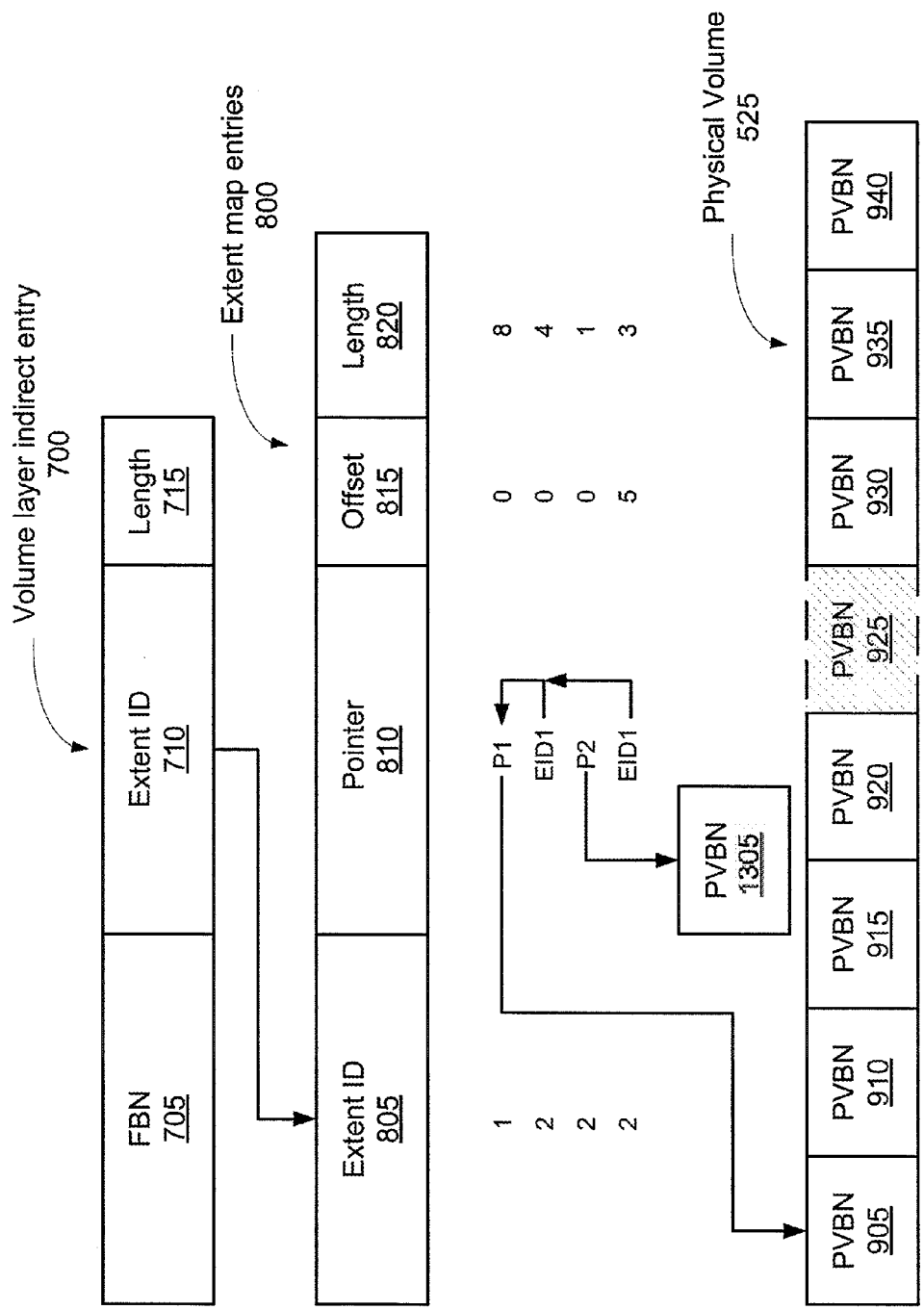
FIG. 13 shows an exemplary overwrite of an extent in an extent-based architecture.

FIG. 12 is an exemplary method 1200 of processing an overwrite request in an extent-based architecture. FIG. 13 illustrates an exemplary overwrite of an extent in an extent-based architecture. At processing block 1205, the storage server 210 allocates an extent identifier 805 for the extent or parts of the extent to be written. At decision block 1210, the storage server 210 determines if the offset between the FBN provided with the write request and the FBN 705 for the overlapping extent is zero.

At processing block 1215, if there is a non-zero offset, the storage server 210 creates a new extent map entry 800 including a newly allocated extent identifier 805, a reference 810 to the existing extent identifier, an offset 815 equal to zero, and a length 820 of the existing data blocks that are not being overwritten (e.g., the value of the offset between the FBN provided with the write request and the FBN 705 for the existing extent). Referring once again to the example in FIG. 13, the storage server allocates extent identifier 2, a reference 810 to the entry 800 for extent identifier 1 (EID 1 points to P1), an initial offset of zero, and a length 820 of four for PVBN's 905-920, which are not being overwritten.

At processing block 1220, if the offset of the FBN provided with the write request from the FBN 705 for the overlapping extent is zero or after creating a new extent map entry 800 for an initial set of blocks not being overwritten, the storage server 210, creates a new extent map entry 800 including the newly allocated extent identifier 805, a reference 810 to the stored data blocks provided with the overwrite request, an offset 815 from the reference 810 where the newly stored data blocks begin, and the length 820 in blocks of the new data. Referring once again to the example in FIG. 13, the storage server allocates extent identifier 2, a reference P2 to newly stored PVBN 1305, an offset of 0, and a length of 1.

At decision block 1225, the storage server 210 determines if the overwrite process has reached the end of the existing extent. For one embodiment, the storage server 210 determines if the sum of the offset from the start of the existing extent for the new data blocks and the length of the new data blocks is greater or equal to length of the existing extent to determine if the end of the existing extent has been reached after completing the overwrite portion of the process 1200. Referring once again to the example in FIG. 13, the new data block has an offset of 4 and length of 1. Given that the sum of the offset and length, five, is less than the length of the existing extent, eight, the remainder of the existing extent would still need to be addressed.

At processing block 1230, if the overwrite has not reached the end of the existing extent, the storage server 210 creates a new extent map entry 800 including the newly allocated extent identifier 805, a reference 810 to the existing extent identifier, an offset 815 equal to the first block of the remainder of existing blocks that are not being overwritten (the offset from the beginning of the existing extent to the first block to be overwritten+the length of the new data), and a length 820 of the remainder of the existing data blocks that are not being overwritten. Referring once again to the example in FIG. 13, three blocks, PVBN's 930, 935, and 940, are also not being overwritten. The storage server allocates extent identifier 2, a reference 810 to the entry 800 for extent identifier 1 (EID 1 points to P1), an offset of five blocks to refer to PVBN 930 from PVBN 905, and a length 820 of three blocks.

At processing block 1235, the storage server 210 uses the allocated extent identifier 805 as a key to traverse the aggregate metadata layer extent-based sorted data structure 600 and adds the one or more new extent map entries 800. At processing block 1240, the storage server 210 overwrites the existing extent identifier 710 with the allocated extent identifier 805 in the existing entry 700 in the volume layer extent-based sorted data structure 600 associated with the FBN 705 for the overlapping extent.

Referring once again to the example in FIG. 13, the data block at PVBN 925 has been effectively overwritten with the data block PVBN 1305 as illustrated by PVBN 925 being outlined in a dashed line and shaded. The overwrite utilizes block sharing to only write one new data block and use references 810 to access the data blocks that are not overwritten by way of the existing extent. Additionally, the data blocks of the existing extent do not need to be read prior to performing an overwrite operation. For one embodiment, if an extent map entry 800 identifies or otherwise refers to the existing extent map entry 800 that includes reference to the data block at PVBN 925 (e.g., by reference to extent identifier 1), that extent remains unchanged by the overwrite because the existing extent still refers to PVBN 905, with an offset of zero, and a length of eight.

For an alternate embodiment, when the storage server 210 detects an overwrite request, the storage server 210 reads the data blocks that are not being overwritten and rewrites them with the new data blocks as a new extent that can be accessed directly by an extent map entry 800 without relying on block sharing with the existing extent (e.g., without referencing the extent identifier 805 of the existing extent). For one embodiment, the storage server 210 includes a setting to alternate between the block sharing overwrite described above with reference to FIGS. 11-13 and the alternate non-sharing overwrite as a trade off between space efficiency (block sharing) and speed efficiency in subsequent read requests directed at the newly overwritten extent (non-sharing).

Thus, embodiments of an extent-based architecture are implemented in a computer system as described herein. In practice, the methods 1100, 1100, and 1200 may constitute one or more programs made up of computer-executable instructions. The computer-executable instructions may be written in a computer programming language, e.g., software, or may be embodied in firmware logic or in hardware circuitry. The computer-executable instructions to implement a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Figure 14:
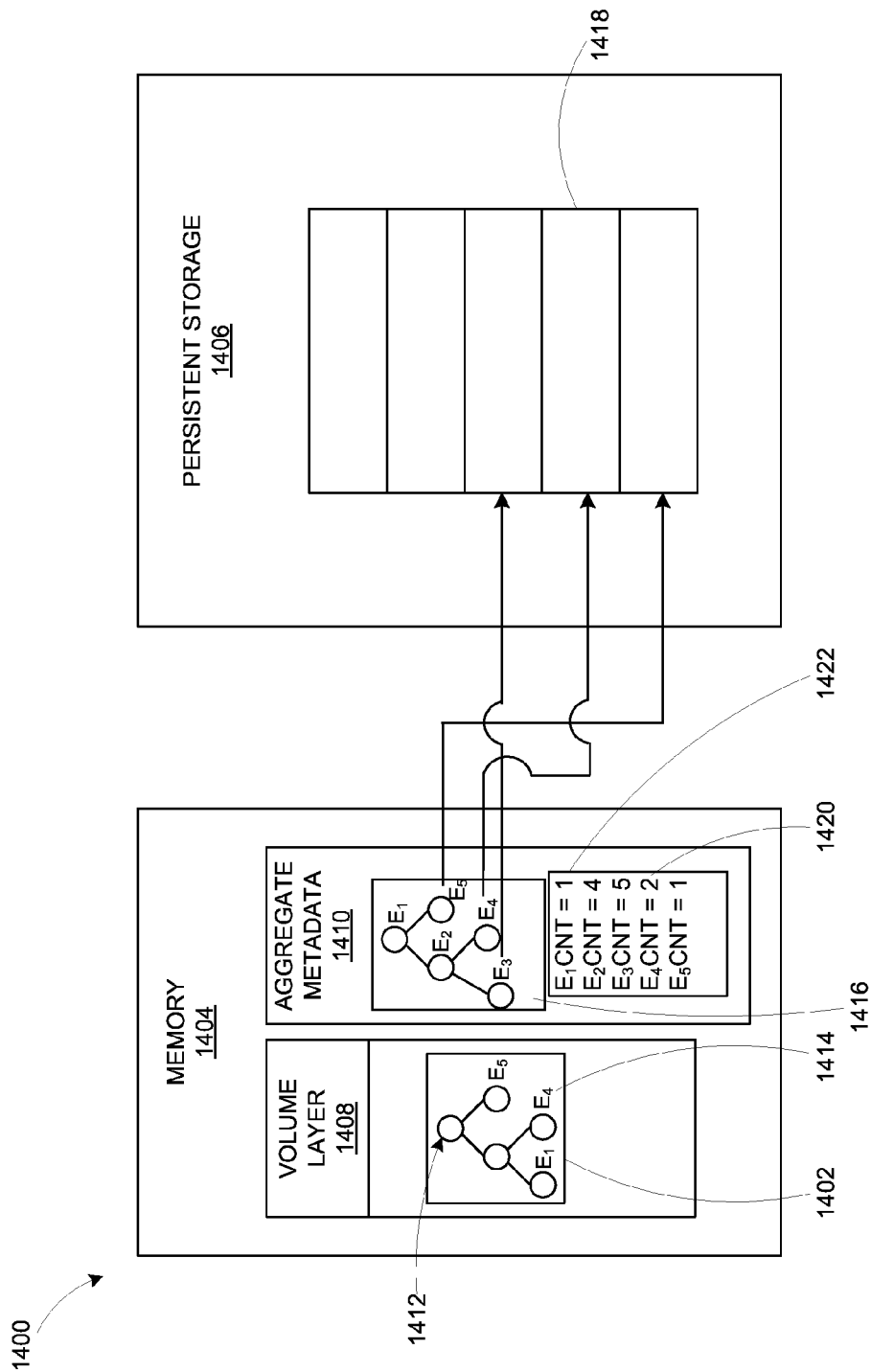
FIG. 14 illustrates a memory state diagram of a storage system before a data object becomes dirty.

FIG. 14 is a memory state diagram of a storage system 1400 before a data object 1402 becomes dirty. The storage system 1400 can be the storage system 100 of FIG. 1. In some embodiments, the storage system 1400 can implement the extent-based storage architecture described above in FIGS. 2-13.

The storage system 1400 includes a memory 1404 and a persistent storage 1406. The memory 1404 is a volatile memory, such as a RAM or a processor cache register, or a combination thereof. The memory 1404 can be the memory 104 of FIG. 1. The persistent storage 1406 is a collection of one or more non-volatile storage devices, such as magnetic disks, magnetic tapes, optical disks, a solid-state drives (SSDs), or any combination thereof. The persistent storage 1406 can be the persistent storage 106 of FIG. 1.

The memory 1404 includes a volume layer 1408, and an aggregate metadata layer 1410. The volume layer 1408 is a portion of the memory 1404 where data objects and other data containers are stored, such as indirect/flexible volumes. The volume layer 1408 is maintained by the operating system of the storage system 1400, such as the operating system 314 of FIG. 3. The volume layer 1408 can be the volume layer 505 of FIG. 5. The volume layer 1408 can include the data object 1402. The data object 1402 is a logical data container. The data object 1402 can be the in-memory data object 110 of FIG. 1.

In some embodiments, the data object 1402 can be represented by a tree structure 1412. The tree structure 1412 has a single root node. The tree structure 1412 can be the extent-based sorted data structure 600 of FIG. 6. The single root node of the tree structure 1412 can be a child node of another reference pointer tree representing a larger data container, such as the volume 108 of FIG. 1.

The tree structure 1412 has one or more nodes. Each of the nodes is a data container. The leaf nodes can include a reference pointer, such as a reference pointer 1414. The reference pointer 1414 can be translated to one or more physical blocks on the persistent storage 1406 through metadata stored in the aggregate metadata layer 1410 further described below. In some embodiments, the leaf nodes of the tree structure 1412 can be the volume layer indirect entry 700 of FIG. 7. The reference pointer 1414 can include an identifier serving as an index to the physical block mapping. The identifier can be the extent ID 710 of FIG. 7 or the extent ID 805 of FIG. 8.

The aggregate metadata layer 1410 is a portion of the memory 1404 configured to store metadata of the storage system 1400. The aggregate metadata layer 1410 is responsible for managing the metadata of a storage aggregate. The storage aggregate consists of a collection of physical storage devices. The storage aggregate can host several discrete filesystem volumes therein, including the volume 108 of FIG. 1. The aggregate metadata layer 1410 is also maintained by the operating system of the storage system 1400. The aggregate metadata layer 1410 can be the aggregate metadata layer 510 of FIG. 5. The aggregate metadata layer 1410 includes a pointer map 1416. In one embodiment, the pointer map 1416 can be the extent-to-physical block map 520 of FIG. 5.

The pointer map 1416 is a translation data structure, such as a table, a dictionary, or a tree structure, that maps each of the reference pointers in the tree structure 1412, such as the reference pointer 1414, to one or more physical blocks on the persistent storage 1406. The mapping can be direct or indirect. Instances of the reference pointer 1414 can map to other reference pointers. For example, reference pointer "E1" can map to reference pointer "E2", which can map to reference pointers "E3" and "E4". In at least one embodiment, each reference pointer, such as the reference pointer 1414, is unique in the pointer map 1416. However, each reference pointer can be used in various data objects and logical data containers in the volume layer 1408. The one or more physical blocks can be represented by one or more physical block numbers, such as the PVBN 905, the PVBN 910, the PVBN 915, and etc. of FIG. 9. The physical block numbers can then be mapped to a data physical location 1418 on the persistent storage 1406. For example, this mapping can be described by a physical volume data structure (not shown), such as the physical volume 525 of FIG. 5 or of FIG. 9.

The pointer map 1416 can track a reference count of each reference pointer, such as a reference count 1420 of the reference pointer 1414. The reference count 1420 is a count of a number of times the reference pointer 1414 is referenced by all logical data containers in the volume layer 1408, which thereby indicates the number of logical data containers that include the corresponding block/extent. Alternatively, the reference count of the reference pointer can be stored on a separate metadata structure in the aggregate metadata layer 1410, such as a pointer reference count map 1422.

Figure 15:
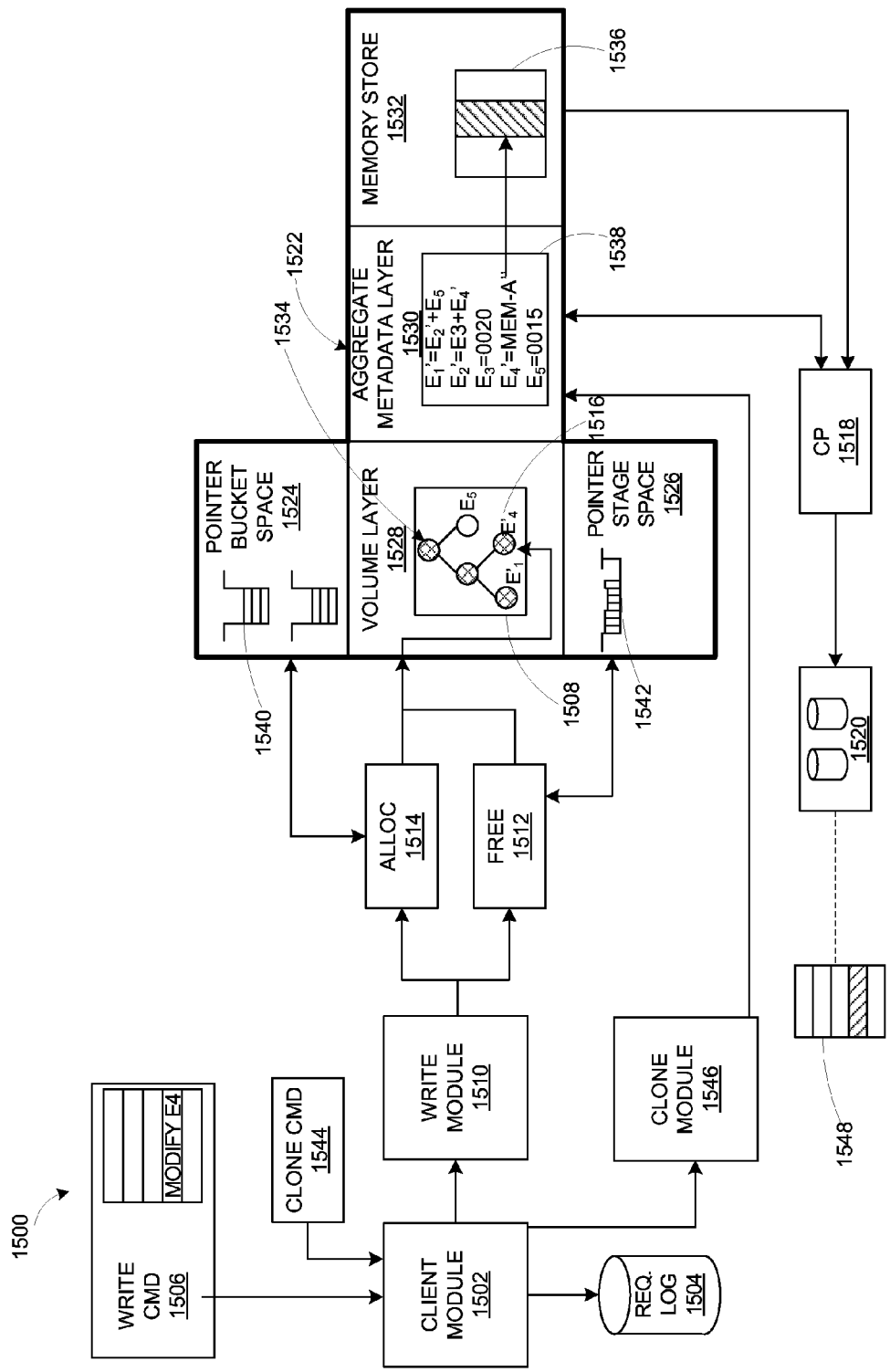
FIG. 15 is a control flow of a storage system.

Referring now to FIG. 15, therein is shown a control flow of a storage system 1500. The storage system 1500 can be the storage system 100 of FIG. 1. The storage system 1500 be a storage server, such as the storage server 210A of FIG. 2A or a storage cluster, such as the clustered network storage system 220 of FIG. 2B. FIG. 15 illustrates how the storage system 1500 handles an incoming write/modify request and how the storage system 1500 handles an incoming clone request after the incoming write/modify request is received.

The storage system 1500 includes a client module 1502. The client module 1502 can be the client module 102 of FIG. 1. Each client request received at the client module 1502 can be recorded on a request log 1504. For example, the request log 1504 can store the I/O requests, as well as other data manipulation and data access requests. In this way, even when the storage system 1500 experiences a memory component failure or a power failure, the request log 1504 can serve to restore the state of the storage system 1500 prior to the failure.

The client module 1502 can receive a modification request 1506. The modification request 1506 is a client request to modify a data object, such as a data object 1508. The data object 1508 is a logical data container, such as the in-memory data object 110 of FIG. 1 or the data object 1402 of FIG. 14. When the client module 1502 receives the modification request 1506, the client module 1502 can pass the modification request 1506 to a write module 1510.

The write module 1510 is configured to write data into data objects of the storage system 1500. When the write module 1510 receives the modification request 1506, in response, the write module 1510 executes a free module 1512 to free an assigned reference pointer, such as the reference pointer 1414 of FIG. 14. The assigned reference pointer can be translated to a location of where the data prior to modification is stored. Also in response to the write module 1510 receiving the modification request 1506, the write module 1510 executes an allocation module 1514 to allocate a replacement reference pointer 1516 for a modified portion of the data object 1508 according to the modification request 1506. The write module 1510, the free module 1512, and the allocation module 1514 can be part of a front-end operator for the operating system of the storage system 1500. A "front-end" operation in this disclosure is defined as a process that manipulates with data in volatile memory without saving it on persistent storage. A "front-end" operator is a module of the storage system 1500 that initiates a front-end operation.

The allocation of the replacement reference pointer 1516 and the freeing of the assigned reference pointer can be done on-the-fly. "On-the-fly" in this context means in response to the modification request 1506, without waiting for another process to finish. An on-the-fly process therefore is a process executed in response to the modification request 1506, without having another process wait for the on-the-fly process to finish. For example, the allocation of the replacement reference pointer 1516 and the freeing of the assigned reference pointer can be done without quiescing new incoming client requests to the data object 1508 at the write module 1510 or at the client module 1502.

For another example, the allocation of the replacement reference pointer 1516 and the freeing of the assigned reference pointer can be done without waiting for a consistency point module 1518 of the storage system 1500 to create an image of the data object 1508 as modified on a persistent storage 1520. The consistency point module 1518 is configured to run an asynchronous process to allocate physical volume block numbers for the storage system 1500. Here, asynchronous means that execution of one process is not dependent on the timing of any other process. The operation of the consistency point module 1518 is further described below.

The storage system 1500 includes an operating system memory 1522. The operating system memory 1522 is a working memory of the storage system 1500. For example, the operating system memory 1522 can be an on-chip cache, a system cache, a RAM, a SSD, a flash memory, or any combination thereof. The operating system memory 1522 can be the memory 104 of FIG. 1 or the memory 1404 of FIG. 14. The operating system memory 1522 includes a pointer bucket space 1524, a pointer stage space 1526, a volume layer 1528, an aggregate metadata layer 1530, and a memory store 1532. The volume layer 1528 is a portion of the operating system memory 1522 configured to store logical data containers for the storage system 1500. The volume layer 1528 can be the volume layer 1408 of FIG. 14. The volume layer 1528 can include a reference tree structure 1534 representing the data object 1508. The reference tree structure 1534 can be the tree structure 1412 of FIG. 14.

The memory store 1532 is a portion of the operating system memory 1522 configured to store data contents of data objects, such as the data object 1508. For example, the memory store 1532 can store an in-memory version of the data object 1508, such as a dirty in-memory image 1536 including a changed portion illustrated by the shaded portion in FIG. 15. The aggregate metadata layer 1530 is a portion of the operating system memory 1522 configured to store metadata of reference pointers and/or logical data containers. For example, the aggregate metadata layer 1530 can include a pointer map 1538 for the reference pointers used in the volume layer 1528. The pointer map 1538 can be the pointer map 1416 of FIG. 14.

The mechanics of on-the-fly allocation and free processing of the reference pointers can benefit from in-memory per-processor data structures in a multi-processing filesystem where multiple front-end operations could be concurrently updating different sections of the same filesystem tree on different processors. Per-processor herein can mean per individual processor in a multi-processor computing system or per-core in a multi-core computing system.

The pointer bucket space 1524 is a global cache to store per-processor structures for reference pointer allocation. For example, the pointer bucket space 1524 can include a buffer bucket 1540. The buffer bucket 1540 represents a set of free reference pointers that are sequentially in the reference pointer number space. The buffer bucket 1540 can be created by reading reference count information from the pointer reference count map 1422 of FIG. 14. The buffer bucket 1540 is generated asynchronously. Asynchronously in this sense means that the process of generating the buffer bucket 1540 is not dependent on any other process, such as any client request or command. An asynchronous process can be processed by a separate and independent processor in a multi-processor system or an independent core, in a multi-core system.

The allocation module 1514 can execute a front-end operation running on any CPU to dequeue the buffer bucket 1540 from the pointer bucket space 1524, and use the available free reference pointers in a multiprocessing-safe (MP safe) fashion. The allocation module 1514 can allocate the free reference pointers to any dirtied extents of data. The buffer bucket 1540 is returned to the pointer bucket space 1524 after use. When the buffer bucket 1540 has been fully used, the buffer bucket 1540 is sent to be applied to a reference count map, such as the pointer reference count map 1422 of FIG. 14. Once applied, the buffer bucket 1540 is filled again to be used for allocation.

In some embodiments, the buffer bucket 1540 tracks free/allocated reference pointers in a contiguous set of reference pointers because write-allocation can work on ranges of freed reference pointers (i.e. Reference pointers with no assigned PVBNs corresponding to data locations on the persistent storage. The buffer bucket 1540 can also allow the use bitmasks and can be make memory consumption of the reference pointers more compact.

The pointer stage space 1526 is a cache to store a set of per-processor structures for buffering freed reference pointers until the freed reference pointers are committed to the reference count metadata map, such as the pointer reference count map 1422 of FIG. 14. The pointer stage space 1526 includes a multi-processor stage, such as a buffer stage 1542. The buffer stage 1542 is a data structure where freed reference pointers can be staged by front-end operations, such as by the free module 1512. The pointer stage space 1526 is maintained as a per-processor cache or as a global cache. When maintained as the global cache, a lock is used for multi-processor processing safety (MP-safe) by restricting access for one processor at a time.

The write module 1510 or the free module 1512 can allocate as many instances of the buffer stage 1542 as needed. The free module 1512 can free reference pointers that are dirty into the buffer stage 1542, and place the buffer stage 1542 back to the pointer stage space 1526. This freeing of reference pointers happens in a MP-safe fashion. When the buffer stage 1542 is full or an event that waits for all outstanding stages occurs, the buffer stage 1542 is sent to be asynchronously committed to the reference count metadata map. Reference counts of the freed reference pointers in the buffer stage 1542 are decremented when committed to the reference count metadata map. After the buffer stage 1542 is emptied when committed to the reference count metadata file, the buffer stage 1542 is ready to be used again. Unlike the buffer bucket 1540, the buffer stage 1542 is used by random reference pointer frees, and so the buffer stage 1542 does not necessarily contain co-located reference pointers.

The write module 1510 that changes the content of the data object 1508 generates an in-memory "dirty" version of the data object 1508, such as the dirty in-memory image 1536. In some embodiments, as a result of the modification request 1506, a dirty version of every reference pointer up the ancestry of the reference tree structure 1534 of the data object 1508 is recursively generated, including other logical containers containing the data object 1508. Because the storage system 1500 recursively dirties all the nodes in the reference tree structure 1534 on every front-end modify operation, the storage system 1500 also allows some of the allocation/free processing to be done on-the-fly by the allocation module 1514 and the free module 1512 instead of the consistency point module 1518 doing the allocation. In some embodiments, the free module 1512 not only can update the reference count metadata file, the free module 1512 can also update a physical volume on-the-fly to free the PVBNs associated with the reference pointer freed by the free module 1512. In some other embodiments, some higher parts of the reference tree structure 1534 are "dirtied" asynchronously as part of the consistency point module 1518.

The allocation and free of the reference pointers result in updates to reference count metadata in the aggregate metadata layer 1530 that track the reference counts for each of the reference pointers. For example, the allocation and freeing of the reference pointer may result in updates to the pointer reference count map 1422 of FIG. 14. These updates generate "dirty" entries to the reference count metadata which also need to be processed by the consistency point module 1518. This is illustrated by FIG. 15. A freeing of an assigned reference pointer to "E4" and an allocation of a new reference pointer results in the node "E4" being marked as dirty. Other nodes up the reference tree structure 1534 are also recursively dirtied. Reference pointers up that points to the dirtied reference point can also be recursively dirtied. For example, when "E4" is dirtied and re-allocated to "E4'", "E1" and "E2" are also updated. The updates may result in updates to the pointer map 1538, where the dirtied reference pointers point to an in-memory object instead of referencing a PVBN.

In one embodiment, the pointer reference count map 1422 itself does not use reference pointers in its tree. The metafile of the pointer reference count map 1422 is outside the volume layer 1528. Therefore, the processing of these "dirty" entries in the pointer reference count map 1422 does not require any on-the-fly processing, and can be handled by the consistency point module 1518.

The client module 1502 can also receive a clone request 1544. The clone request 1544 is a client request to perform a clone operation on a data object, such as the data object 1508. The clone operation can be performed by a clone module 1546. The clone module 1546 is configured to perform a front-end operation to clone data objects. Since every "dirty" node of the reference tree structure 1534 in-memory gets a reference pointer on-the-fly, the process of creating a clone of any data object represented by a tree structure of reference pointers, such as the reference tree structure 1534, reduces to taking a hierarchical reference count on the reference pointer pointing to the root of that tree.

The storage system 1500 supports hierarchical reference counting of nodes in a filesystem tree, such as the reference tree structure 1534. All data objects in the storage system 1500 point to physical blocks using the reference pointers, such as ExtentId (EId) as described in FIGS. 2-14. This means, any indirect pointer in a node of the filesystem tree uses a reference pointer to point to its child node. The pointer map 1538 captures the mapping between a reference pointer and the actual PVBNs (i.e., the physical volume block numbers that address blocks on persistent storage).

Every use of a reference pointer, such as an EId, in any data object in the storage system 1500 is tracked as a single reference count by a reference count metafile, such as the pointer reference count map 1422. For example, if three objects reference the same set of data blocks using E1, then the reference count for E1 is 3. An entire file system tree of objects can be tracked by a hierarchical reference count (h-refcnt) on that reference pointer of the root of that tree. In other words, a h-refcnt on a root node of a data object is the same as a reference count increment of each reference pointer pointed to by walking down the tree rooted at the data object.

All data objects in the storage system 1500 are essentially a tree of reference pointers. In a hierarchically reference counted file system like the storage system 1500, any data object can be instantaneously cloned by creating a new h-refcnt on the root of the tree of reference pointers that represent the data object, such as the reference tree structure 1534 of the data object 1508. Any data object that has been written out to persistent storage already has a reference pointer assigned to it. Therefore, for example, creating an instantaneous clone of the data object 1508 is accomplished by taking an extra h-refcnt on the reference pointer of the root node of the reference tree structure 1534 of the data object 1508. Creating a clone of a data object that has not yet been written to persistent storage is done by allocation a reference pointer on-the-fly.

There are two cases of this: (a) a "dirty" in-memory version of an object that has been modified by a client operation, such that it is different from its original copy on persistent storage, or (b) a brand new object that has just been created in-memory as a result of client operations (and is therefore, also "dirty"). For example in case (a), the aggregate metadata layer 1530 can be updated following the method 1100 of FIG. 11. For example in case (b), the aggregate metadata layer 1530 can be updated following the method 1200 of FIG. 12 as further illustrated by FIG. 13.

For the purpose of this disclosure, both cases reduce to the same problem. To ensure that a reference pointer tree of a dirtied data object has an updated reference pointer in every node, every modify operation or write operation performed at the write module 1510 free the outdated assigned reference pointer on-the-fly and allocate a new reference pointer on-the-fly with the methods described above. Thus, creating a clone of a data object with a dirty in-memory version, such as the data object 1508, can be done also by hierarchically reference counting the reference pointer tree of the data object.

Alternatively in some embodiments, the volume layer 1528 and the aggregate metadata layer 1530 are not separated. For example, metadata of the storage system 1500 can be stored within the volume layer 1528. In those embodiments, reference counts of the reference pointers can be put inside the volume layer 1528. The front-end operations can free or allocate reference pointers on-the-fly in the same manner as when the aggregate metadata layer 1530 is separate. These tracking/logging mechanisms described above for the aggregate metadata layer 1530 can be built inside each flexible volume inside the volume layer 1528, such as the volume 108 of FIG. 1.

The storage system 1500 includes the consistency point module 1518 is configured to run an asynchronous process to allocate physical volume block numbers for the storage system 1500. The allocation module 1514 and the free module 1512 can allocate and free the reference pointers used by the storage system 1500 in the volume layer 1528. In some embodiments, the free module 1512 can also free the PVBNs associated with the reference pointer being freed. The consistency point module 1518 can allocate a new PVBN for each reference pointer marked as dirty by the write module 1510. The allocation of the PVBNs is done asynchronously because it is more efficient to work on a collected number of writes on a file than each individual write. The consistency point module 1518 can lay the physical volume blocks out on persistent storage in clever ways to optimize for future IO patterns. In one embodiment, the consistency point module 1518 can handle both the allocation and freeing of the PVBNs. In other embodiments, the freeing of the PVBNs are handled by the free module 1512 simultaneously as freeing of the reference pointers in volume layer 1528

Once the consistency point module 1518 allocates the physical volume block numbers, the consistency point module 1518 can also update a persistent storage image 1548 of the data object 1508 in the persistent storage 1520. For example, the consistency point module 1518 can update the persistent storage image 1548 so that it is consistent with the dirty in-memory image 1536, including copying the changed portion over to the persistent storage 1520.

Figure 16:
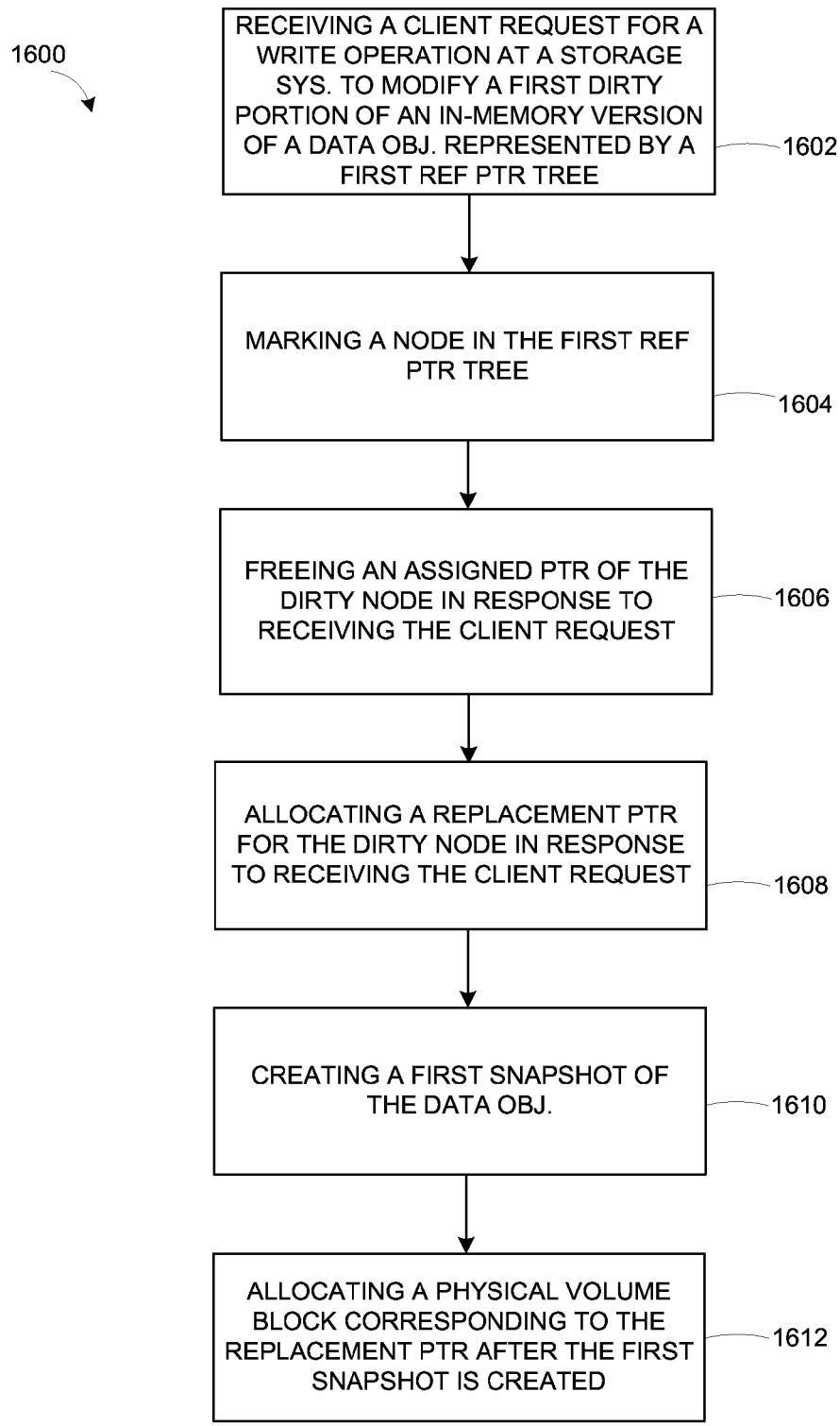
FIG. 16 is a flow chart of an embodiment of a method of implementing a mechanism to instantaneous clone data objects on a storage system.

Referring now to FIG. 16, therein is shown a flow chart of an embodiment of a method 1600 of implementing a mechanism to instantaneous clone data objects on a storage system, such as the storage system 100 of FIG. 1. The method 1600 includes initially receiving a client request for a write operation at a storage system to modify a first dirty portion of an in-memory version of a data object represented by a first reference pointer tree, at step 1602. The first dirty portion can be a block, an extent, or a set of blocks of the in-memory version of the data object. Step 1602, for example, can be executed by the client module 1502 of FIG. 15. The method 1600 continues by marking a node in the first reference pointer tree as dirty, wherein the dirty node represents the first dirty portion at step 1604. Step 1604, for example, can be executed by the write module 1510 of FIG. 15.

Next, at step 1606 an assigned pointer of the dirty node is freed on-the-fly in response to receiving the client request. In some embodiments, freeing the assigned pointer causes freeing of a physical volume block space corresponding to the assigned pointer. The freeing of the physical volume block space on a persistent storage can also be done on-the-fly in response to receiving the client request. Here, on-the-fly here means that the freeing is in response to the client request for the write operation, but without waiting for another operation on the data object to finish. Step 1606, for example, can be executed by the free module 1512 of FIG. 15.

In at least one embodiment, freeing the assigned pointer can be done by placing the assigned pointer in a per-processor cache stage. When the per-processor cache stage is full, the per-processor cache stage is asynchronously committed to a pointer reference count metadata file in memory. Alternatively in another embodiment, freeing the assigned pointer can be done by placing the assigned pointer in a global cache stage, where the global cache stage is accessed with a lock for multiprocessor processing safety.

Also after step 1604, at step 1608, a replacement pointer for the dirty node is allocated on-the-fly in response to receiving the client request. Here, on-the-fly here means that the allocation is in response to the client request for the write operation, but the execution of the allocation is without waiting for another operation on the data object to finish. In some embodiments, the replacement pointer and the assigned pointer are reference identifiers that are unique across a metadata map in a storage aggregate metadata layer. However, in a volume layer of the storage system, multiple references to a same reference identifier can exist in different data objects. The reference identifiers can translate to one or more physical block locations by the metadata map. The physical block locations correspond to one or more persistent storage devices. Step 1608, for example, can be executed by the allocation module 1514 of FIG. 15.

Allocation of the replacement pointer can be executed by a first processor of a multiprocessor system and freeing of the assigned pointer can be executed by a second processor of the multiprocessor system. Allocating the replacement pointer includes storing an extent map entry of the replacement pointer mapped to the physical volume block in a metadata extent map on an aggregation layer of the storage system. In some embodiments, allocating the replacement pointer includes allocating the replacement pointer from a per-processor cache bucket, the per-processor cache bucket including freed virtual volume pointers spatially co-located in a reference pointer space of the storage system. When the cache bucket is fully used, the per-processor cache bucket is re-allocated by determining co-located reference pointers from a pointer reference count metadata file, such as the pointer reference count map 1422 of FIG. 14, in memory.

After step 1608, the method 1600 continues with creating a first snapshot of the data object, where the first snapshot is represented by a second reference pointer tree at step 1610. After step 1610, the second reference pointer tree would have the replacement pointer as a node. In some embodiment, creating the first snapshot includes determining a hierarchical reference count of a root node of the first reference pointer tree, wherein the hierarchical reference count is determined by incrementing a reference count for each node of the first reference pointer tree. In at least one embodiment, a second snapshot of the data object can be simultaneously created with the first snapshot. Step 1610, for example, can be executed by the clone module 1546 of FIG. 15.

Next, the method 1600 continues with allocating a physical volume block corresponding to the replacement pointer after the first snapshot is created at step 1612. Allocating the physical volume block includes storing a mapping of the replacement pointer to the physical volume block in a metadata map on an aggregate metadata layer of the storage system. Allocation of the physical volume block is asynchronous to the creating of the first snapshot. Here, asynchronous refers to that execution of one process is not dependent on the timing of any other process. Hence, execution of the allocation of the physical volume block is not in response to the first snapshot being created. Step 1612, for example, can be executed by the consistency point module 1518 of FIG. 15.

Figure 17:
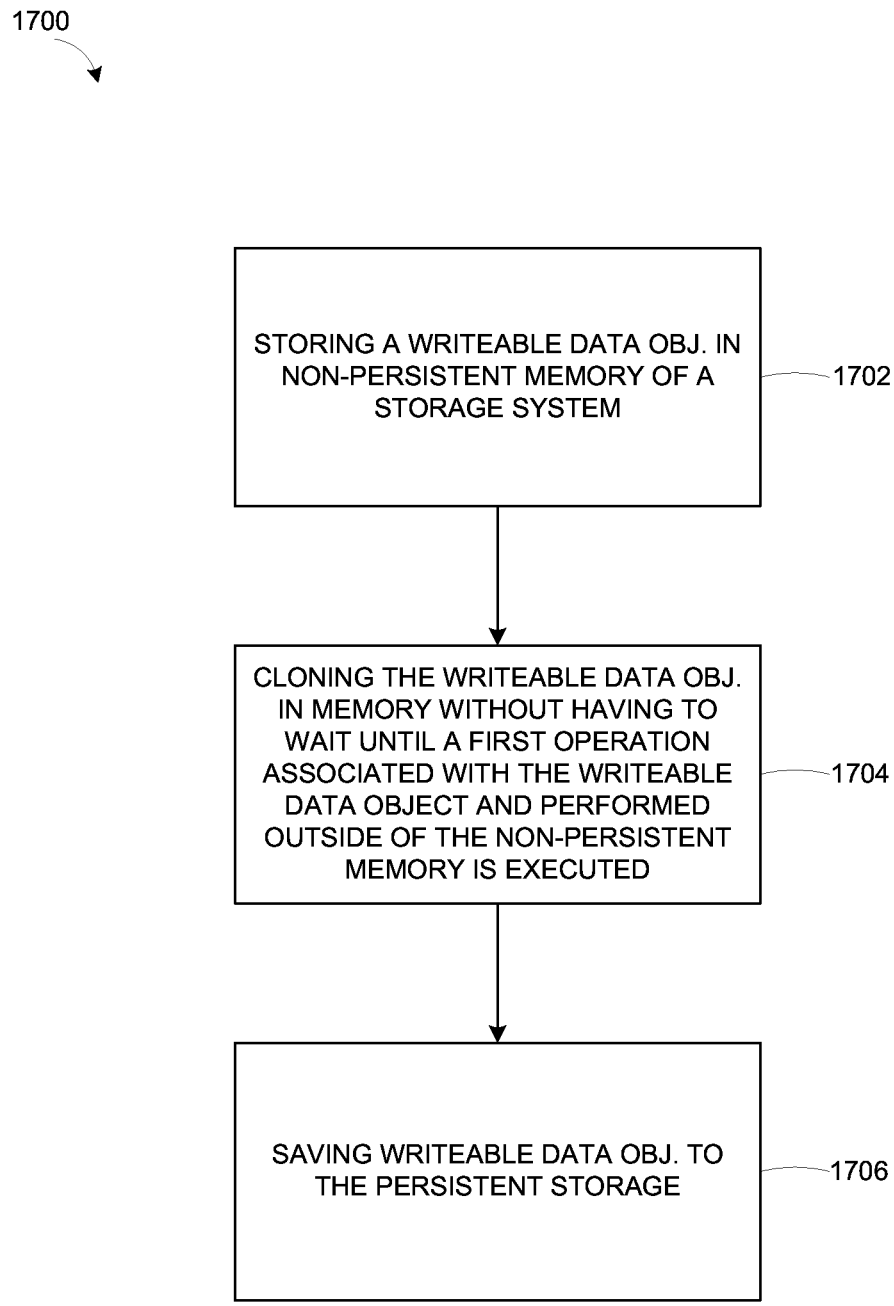
FIG. 17 is a flow chart of an embodiment of a method of operating a storage system.

Referring now to FIG. 17, therein is shown a flow chart of an embodiment of a method 1700 of operating a storage system, such as the storage system 100 of FIG. 1. Initially, the method 1700 includes storing a writeable data object in non-persistent memory of a storage system at step 1702. Step 1702, for example, can be executed by the write module 1510 of FIG. 15.

Next, the method 1700 continues by cloning the writeable data object in non-the non-persistent memory at step 1704. Step 1704, for example, can be executed by the clone module 1546 of FIG. 15. In one embodiment, cloning the writeable data object can be done without having to wait until a first operation associated with the writeable data object and performed outside of the non-persistent memory is executed. For example, cloning the writeable data object in memory is performed without having to wait until the writeable data object is saved to persistent storage. In at least one other embodiment, cloning the writeable data object in memory is performed without pausing a second operation on the storage system until the cloning is completed. For example, cloning the writeable data object in memory is performed without pausing incoming operations on the writeable data object until the cloning is completed.

After step 1704, the method 1700 then saves the writeable data object to the persistent storage at step 1706. Step 1706, for example, can be executed by the consistency point module 1518 of FIG. 15.

Figure 18:
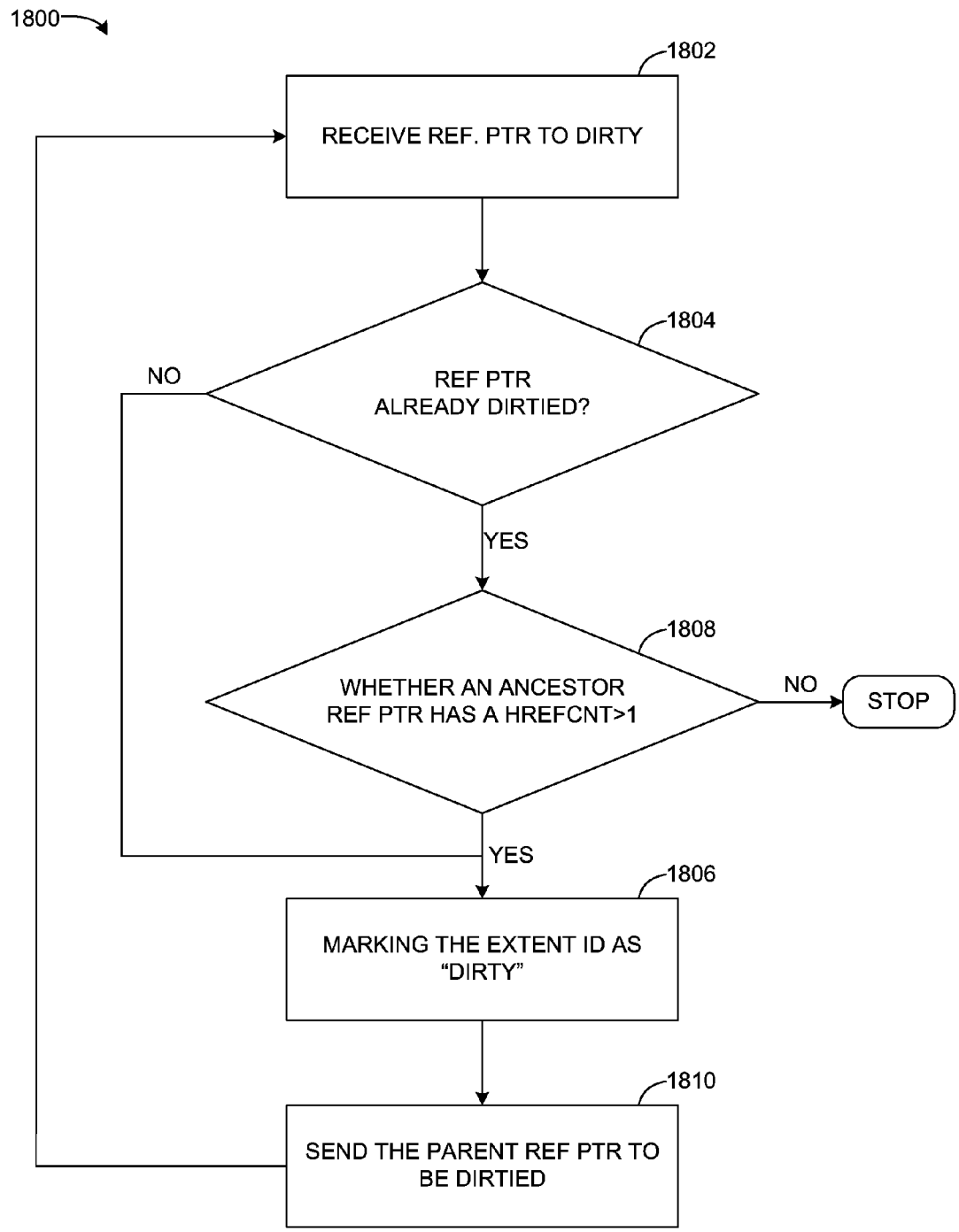
FIG. 18 is a flow chart of a method of dirtying data objects upon receiving a front end operation.

FIG. 18 illustrates a flow chart of an embodiment of a method 1800 of dirtying data objects, such as the data object 1508 of FIG. 15, upon receiving a front end operation in a storage system, such as the storage system 100 of FIG. 1. The front-end operation can be an operation to write or modify the data object as described in FIG. 11 and FIG. 12.

The step 1802 includes receiving a reference pointer, such as the extent identifier 710 of FIG. 7 and/or the reference pointer 1414 of FIG. 14, to dirty. The reference pointer representing the data object can be a target node of a volume-layer tree structure, such as the reference tree structure 1534 of FIG. 15, or an aggregate metadata layer pointer map, such as the pointer map 1416 of FIG. 14. For example, the receiving of the reference pointer to dirty can be in response to receiving a first front end operation to modify the data object. The first front end operation can specify a file block number that corresponds to the target node in the tree structure. The target node corresponds to the extent identifier.

The method 1800 continues with a step 1804 of determining whether the reference pointer is already dirtied. When the reference pointer is not already dirtied, the method 1800 continues to a step 1806 of marking the reference pointer as "dirty." When the reference pointer is already dirtied, the method 1800 continues to a step 1808 of determining whether an ancestor reference pointer has a hierarchical reference count, such as the hierarchical reference count 1420 of FIG. 14, greater than 1. When at least one ancestor reference pointer of the reference pointer (i.e. a reference point that directly or indirectly references the reference pointer) is determined to have a hierarchical reference count greater than one, the method 1800 continues to the step 1806. Otherwise, when none of the ancestor reference pointers has a hierarchical reference count greater than one, the method 1800 terminates. The step 1808 ensures that the reference pointer is re-dirtied when a clone of the data object represented by the reference pointer has been made, and that both modified versions of the clone and the original have to be stored onto persistent storage by the consistency point module.

Dirtying the reference pointer includes marking the reference pointer as "dirty" in an in-memory metadata structure, such as in the volume layer 1528 or the aggregate layer 1530 of FIG. 15. The dirty marking allows for the consistency point module 1518 of FIG. 15 on a subsequent consistency point, from the time the first front end operation is received, to process the data object represented by the reference pointer for storage on a physical storage, such as the persistent storage 1520 of FIG. 15.

Following the step 1806, the method 1800 continues to a step 1810 of sending a parent reference pointer of the reference pointer to be dirtied when the reference pointer is not a root node of the reference tree. The step 1810 represents the recursive mechanism of the method 1800 to recursively traverse up the reference tree to dirty the reference tree nodes until a root node is reached or until a reference node that has already been dirtied is reached.

Figure 19A:
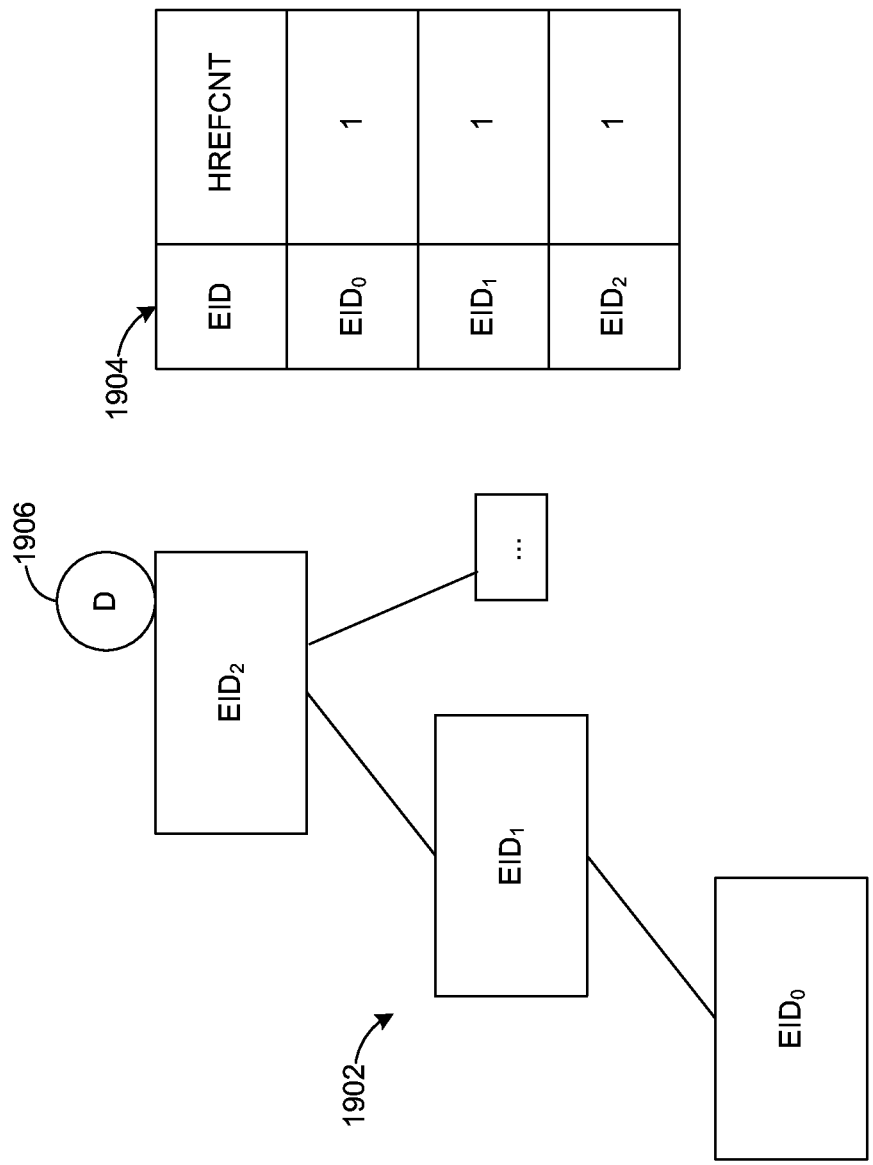
FIGS. 19A-19D illustrate an example of an instantaneous cloning operation through data flow charts of a data object represented by a tree structure.

FIGS. 19A-19D illustrate an example of an instantaneous cloning operation through data flow charts of a data object represented by a tree structure 1902, such as the tree structure 1412 of FIG. 14. The tree structure 1902 can be a tree structure represented by extent identifiers. FIG. 19A illustrates the tree structure 1902 and a first hierarchical reference count map 1904, such the reference count map 1422 of FIG. 14, corresponding to the tree structure 1902.

In FIG. 19A, it is illustrated that a dirtied node 1908 of the tree structure 1906 has a dirty tag 1906 associated with it. The dirty tag 1906 signals to a consistency point module, such as the consistency point module 1518 of FIG. 15, that a front-end operation has modified an extent map entry, such as the extent map entry 800 of FIG. 8, and the data referenced by the dirtied node 1908 may need to be saved to persistent storage. The dirtied node ($EID_2$) 1908 can have other child nodes represented by reference pointers not illustrated by FIG. 19A.

Figure 19B:
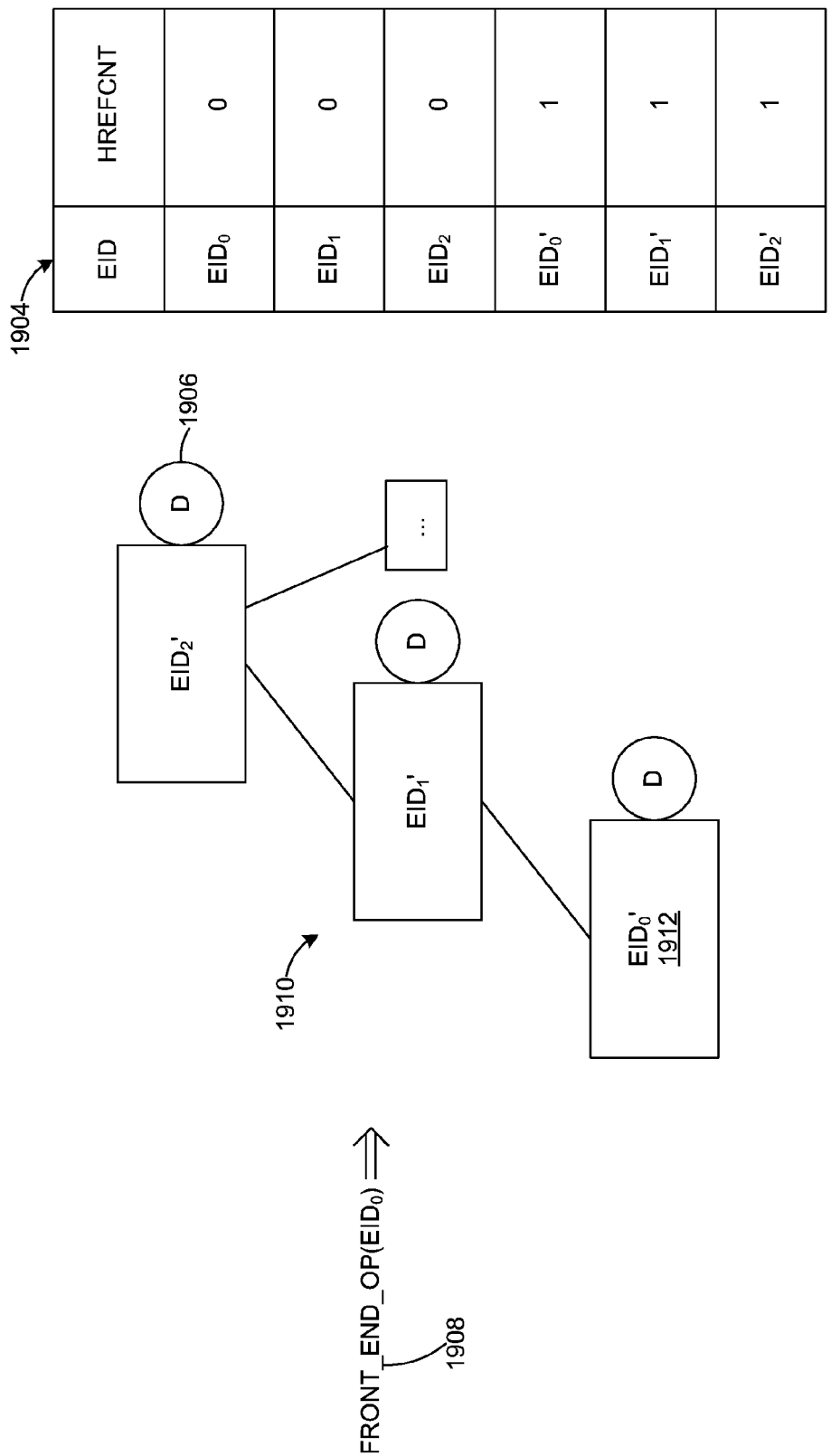

FIG. 19B illustrates a first dirtied tree structure 1910 after a first front-end operation 1908 to modify a first reference pointer ($EID_0$) 1912 is executed. The first dirtied tree structure 1910 shows the resulting tree structure after the tree structure 1902 of FIG. 19A has been recursively dirtied by the method 1800 of FIG. 18. The reference pointers of the first dirtied tree structure 1910 have also been re-allocated (i.e. old pointers from the tree structure 1902 freed and new pointers allocated). The hierarchical reference count map 1904 can be updated to reflect the hierarchical reference counts of the newly allocated reference pointers.

Figure 19C:
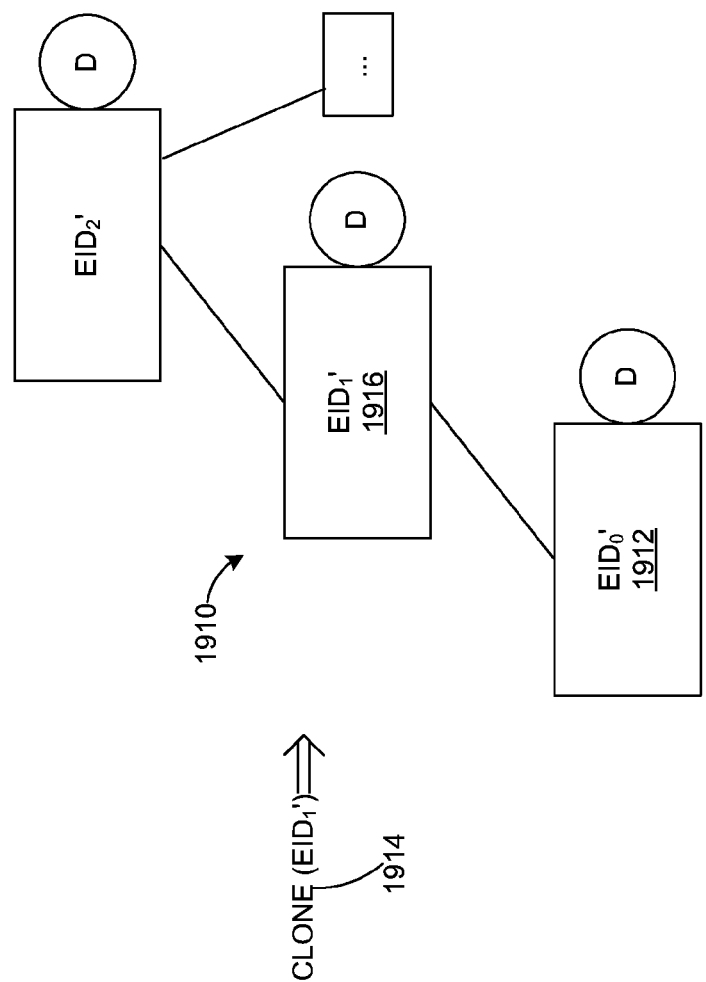

FIG. 19C illustrates a clone operation 1914 on a second reference pointer ($EID_1'$) 1916 of the first dirtied tree structure 1910. The clone operation 1914 modifies the hierarchical reference count map 1904 by incrementing a first reference count entry 1920 for the first reference pointer 1912 and a second reference count entry 1922 for the second reference pointer 1916.

Figure 19D:
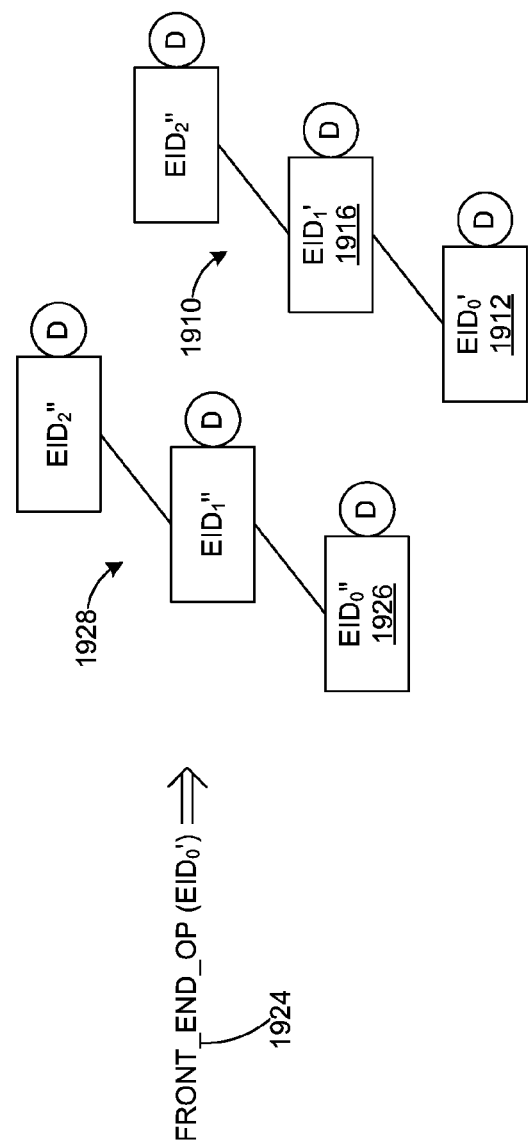

FIG. 19D illustrates a second front-end operation 1924 to modify the first reference pointer 1912. When the second front-end operation 1924 is executed, a third reference pointer 1926 is allocated. The first reference pointer 1912 is not freed because the first reference count entry 1920 for the first reference pointer 1912 was greater than one prior to receiving the second front-end operation 1924.

The execution of the second front-end operation 1924 results in generation of a second dirtied tree structure 1928. The chain of ancestry of the third reference pointer 1926 are all dirtied in accordance with the recursive dirtying method 1800 described above. After the second front-end operation 1924 is executed, the hierarchical reference count map 1904 is updated once again.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that embodiments of this invention be limited only by the following claims and equivalents thereof.

What is claimed is:

1. A method comprising:
   storing a dirty writeable data object in a non-persistent memory of a storage system;
   allocating a data pointer to the dirty writable data object without having to wait until the dirty writeable data object is saved to a persistent storage; and
   cloning the dirty writeable data object in the non-persistent memory without having to wait until the dirty writeable data object is saved to the persistent storage and without having to pause incoming write operations on the dirty writeable data object during said cloning.

2. The method of claim 1, further comprising accessing a clone data object created from the cloning when modifying the dirty writeable data object.

3. The method of claim 1, further comprising deleting a clone data object created from the cloning when modifying the dirty writeable data object.

4. A method comprising:
   receiving a client request for a write operation at a storage system to modify a first dirty portion of an in-memory version of a data object represented by a first reference pointer tree;
   marking a node in the first reference pointer tree as a dirty node, wherein the dirty node represents the first dirty portion;
   allocating a replacement pointer for the dirty node in response to receiving the client request without having to wait until the in-memory version of the data object is saved to persistent storage; and
   creating a first snapshot of the data object, the first snapshot represented by a second reference pointer tree, the second reference pointer tree having the replacement pointer as a node.

5. The method of claim 4, wherein creating the first snapshot includes determining a hierarchical reference count of a root node of the first reference pointer tree, wherein the hierarchical reference count is determined by incrementing a reference count for each node of the first reference pointer tree.

6. The method of claim 4, further comprising freeing an assigned pointer of the dirty node in response to receiving the client request without having to wait until the in-memory version of the data object is saved to the persistent storage.

7. The method of claim 6, wherein freeing the assigned pointer includes freeing the assigned pointer by placing the assigned pointer in a per-processor cache stage.

8. The method of claim 7, further comprising committing the per-processor cache stage asynchronously to a pointer reference count metadata file in memory when the per-processor cache stage is full.

9. The method of claim 6, wherein freeing the assigned pointer includes freeing the assigned pointer by placing the assigned pointer in a global cache stage, where the global cache stage is accessed with a lock for multiprocessor processing safety.

10. The method of claim 6, wherein freeing the assigned pointer causes freeing a physical volume block space corresponding to the assigned pointer.

11. The method of claim 6, wherein allocating the replacement pointer is executed by a first processor in a multiprocessor system; and wherein freeing the assigned pointer is executed by a second processor in the multiprocessor system.

12. The method of claim 4, wherein allocating the replacement pointer includes allocating the replacement pointer from a per-processor cache bucket, the per-processor cache bucket including freed reference pointers spatially co-located in a reference pointer space of the storage system.

13. The method of claim 12, further comprising re-allocating the per-processor cache bucket, when the cache bucket is fully used, by determining co-located reference pointers from a pointer reference count metadata file in memory.

14. The method of claim 4, further comprising allocating asynchronously a physical volume block corresponding to the replacement pointer after the first snapshot is created.

15. The method of claim 14, wherein allocating the physical volume block includes storing a mapping of the replacement pointer to the physical volume block in a metadata map on an aggregate metadata layer of the storage system.

16. The method of claim 4, wherein the replacement pointer is unique across a metadata map of the storage system between reference pointers and physical block identifiers on a persistent storage device.

17. The method of claim 4, further comprising creating a second snapshot of the data object simultaneously with the creating of the first snapshot.

18. A storage server system comprising:

a persistent storage device including a persistent storage image of a data object;

a processor configured to store, in a non-persistent memory, an in-memory version of the data object represented by a first reference pointer tree, wherein a first dirty portion of the in-memory version is different from the persistent storage image and the first dirty portion is represented by a dirty node in the first reference pointer tree;

a front-end allocation module configured to allocate a replacement pointer for the dirty node in response to a client request to make the in-memory version different from the persistent storage image without having to wait until the in-memory version of the data object is saved to persistent storage; and a snapshot module configured to create a first snapshot of the data object represented by a second reference pointer tree having the replacement pointer as a node in the second reference pointer tree.

19. The storage server system of claim 18, further comprising a consistency point module configured to allocate a physical volume block corresponding to the replacement pointer after the first snapshot is created.

20. The storage server system of claim 18, further comprising a front-end free module configured to free an assigned pointer of the dirty node in response to receiving the client request without having to wait until the in-memory version of the data object is saved to the persistent storage.

* * * * *